US011553158B2

(12) United States Patent
Sato et al.

(10) Patent No.: US 11,553,158 B2
(45) Date of Patent: Jan. 10, 2023

(54) INFORMATION PROCESSING APPARATUS, INFORMATION PROCESSING METHOD, AND PROGRAM

(71) Applicant: SONY GROUP CORPORATION, Tokyo (JP)

(72) Inventors: Koji Sato, Tokyo (JP); Ryusei Koike, Kanagawa (JP); Koji Furusawa, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/290,513

(22) PCT Filed: Oct. 25, 2019

(86) PCT No.: PCT/JP2019/041857
§ 371 (c)(1),
(2) Date: Apr. 30, 2021

(87) PCT Pub. No.: WO2020/095714
PCT Pub. Date: May 14, 2020

(65) Prior Publication Data
US 2022/0014713 A1    Jan. 13, 2022

(30) Foreign Application Priority Data

Nov. 9, 2018    (JP) .............................. JP2018-211357

(51) Int. Cl.
*H04N 7/15*    (2006.01)
*H04N 7/14*    (2006.01)

(52) U.S. Cl.
CPC ............. *H04N 7/157* (2013.01); *H04N 7/147* (2013.01); *H04N 7/152* (2013.01)

(58) Field of Classification Search
USPC ...................................................... 348/14.07
See application file for complete search history.

(56) References Cited

U.S. PATENT DOCUMENTS 11,233,974 B1 *  1/2022  Adcock .................. G06F 3/167
2011/0276902 A1 * 11/2011  Li ............................ H04N 7/15
715/757

(Continued)

FOREIGN PATENT DOCUMENTS

| JP | 2016-139911 A | 8/2016 |
| WO | WO 2016/158267 A1 | 10/2016 |
| WO | WO 2018/020766 A1 | 2/2018 |

*Primary Examiner* — Amal S Zenati
(74) *Attorney, Agent, or Firm* — Paratus Law Group, PLLC

(57) ABSTRACT

There is provided an information processing apparatus, an information processing method, and a program that make it possible to recognize a state of telecommunication among multiple points more easily. Information regarding telecommunication performed among telecommunication apparatuses is received, and an image that indicates a state of telecommunication between a first telecommunication apparatus and another communication apparatus and a state of telecommunication between a plurality of other telecommunication apparatuses is generated on the basis of the received information, and then the generated image is displayed. The present disclosure can be applied, for example, to an information processing apparatus, a telecommunication apparatus, electronic equipment, an information processing method, a program, or the like.

19 Claims, 19 Drawing Sheets

(56) References Cited

U.S. PATENT DOCUMENTS

2016/0182854 A1\* 6/2016 Suzuki ............... H04N 21/4223
　　　　　　　　　　　　　　　　　　　　348/14.07
2018/0332254 A1\* 11/2018 Sakai ....................... H04N 7/15
2021/0084259 A1\* 3/2021 Kies ....................... H04N 7/147

\* cited by examiner

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2019/041857 (filed on Oct. 25, 2019) under 35 U.S.C. § 371, which claims priority to Japanese Patent Application No. 2018-211357 (filed on Nov. 9, 2018), which are all hereby incorporated by reference in their entirety.

TECHNICAL FIELD

The present disclosure relates to an information processing apparatus, an information processing method, and a program, and specifically to an information processing apparatus, an information processing method, and a program that make it possible to recognize a telecommunication state among multiple points more easily.

BACKGROUND ART

Conventionally, a system (for example, a videophone conference system) is available in which multiple points (three or more points) are connected to each other to perform telecommunication. Further, it has been proposed that, in such a system as just described, distances to a great number of telecommunication partners are produced by using a three-dimensional representation for connection of spaces to implement more comfortable communication (for example, refer to PTL 1).

CITATION LIST

Patent Literature

[PTL 1]
PCT Patent Publication No. WO2018/020766

SUMMARY

Technical Problem

However, according to the method disclosed in PTL 1, since information of telecommunication between a telecommunication source itself and a telecommunication destination or information of telecommunication between telecommunication destinations are presented individually, it is difficult to recognize an overall state of telecommunication among multiple points.

The present disclosure has been made in view of such a situation as described above and makes it possible to recognize a state of telecommunication among multiple points more easily.

Solution to Problem

An information processing apparatus according to one aspect of the present technology includes a reception unit configured to receive information regarding telecommunication performed among telecommunication apparatuses, a generation unit configured to generate, on the basis of the information received by the reception unit, an image indicative of a state of telecommunication between a first telecommunication apparatus and another telecommunication apparatus and a state of telecommunication between a plurality of other telecommunication apparatuses, and a display unit configured to display the image generated by the generation unit.

An information processing method according to one aspect of the present technology includes receiving information regarding telecommunication performed among telecommunication apparatuses, generating, on the basis of the received information, an image indicative of a state of telecommunication between a first telecommunication apparatus and another telecommunication apparatus and a state of telecommunication between a plurality of other telecommunication apparatuses, and displaying the generated image.

A program according to one aspect of the present technology is a program for causing a computer to function as a reception unit configured to receive information regarding telecommunication performed among telecommunication apparatuses, a generation unit configured to generate, on the basis of the information received by the reception unit, an image indicative of a state of telecommunication between a first telecommunication apparatus and another telecommunication apparatus and a state of telecommunication between a plurality of other telecommunication apparatuses, and a display unit configured to display the image generated by the generation unit.

In the information processing apparatus, the information processing method, and the program according to one aspect of the present technology, information regarding telecommunication performed among telecommunication apparatuses is received, an image that indicates a state of telecommunication between a first telecommunication apparatus and another telecommunication apparatus and a state of telecommunication between a plurality of other telecommunication apparatuses is generated on the basis of the received information, and then the generated image is displayed.

DESCRIPTION OF EMBODIMENT

Figure 1:
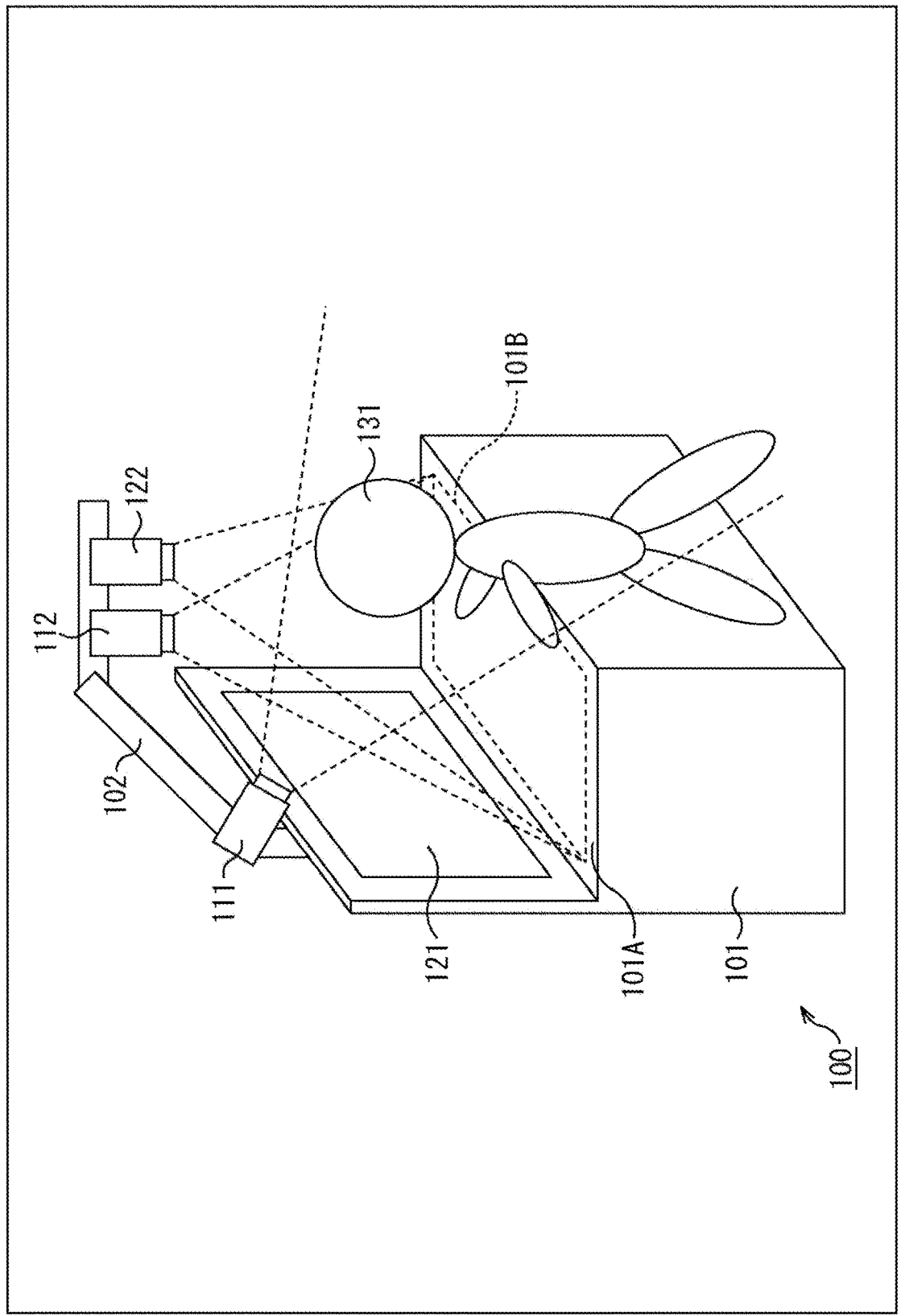
FIG. 1 is a view depicting an example of a main configuration of a terminal apparatus.

In the following, a mode for carrying out the present disclosure (hereinafter referred to as an embodiment) is described. It is to be noted that the description is given in the following order.

1. Presentation of State in Communication System
2. First Embodiment (Communication System)
3. Appendix 1. Presentation of State in Communication System <Communication System>

Conventionally, a system (for example, a videophone conference system) is available in which multiple points (three or more points) are connected to each other to perform telecommunication. By such a system as just described, various communications in a group including multiple points can be implemented. For example, it is possible to speak to a plurality of partners at the same time and perform a plurality of conversations between different points in parallel.

It has been proposed that, in such a telecommunication system as just described, for example, by using a three-dimensional representation to connection of spaces, for example, as disclosed in PTL 1, the distances to a great number of telecommunication partners are produced to implement more comfortable communication.

However, according to the method disclosed in PTL 1, since information of telecommunication between a telecommunicating source itself and a telecommunication destination and information of telecommunication between telecommunication destinations are presented individually, although situations of individual telecommunications can be recognized individually, it is difficult to recognize the overall state of telecommunication among multiple points. For example, in order to recognize the overall state of telecommunication among multiple points, a user must perform such complicated works that information of telecommunication between a telecommunication source itself and a telecommunication destination is displayed to allow recognizing of a state of the telecommunication and then information of telecommunication of the telecommunication destination is displayed to allow recognizing of a telecommunication state and so forth. Further, since the state of telecommunication varies from moment to moment, there is the possibility that it may be difficult for such a method as just described to accurately recognize the state of telecommunication.

<Presentation of State of Telecommunication Among Multiple Points>

Therefore, an image that indicates a state of telecommunication between a certain terminal apparatus and another terminal apparatus and a state of telecommunication between a plurality of other terminal apparatuses is displayed.

For example, information regarding telecommunication between terminal apparatuses (for example, telecommunication apparatuses) is received, and an image that indicates a telecommunication state between a certain terminal apparatus (for example, a first telecommunication apparatus) and another terminal apparatus (for example, another telecommunication apparatus) and a telecommunication state between a plurality of other terminal apparatuses is generated on the basis of the received information, and then the generated image is displayed.

For example, an information processing apparatus is configured such that it includes a reception unit configured to receive information regarding telecommunication performed among terminal apparatuses (for example, telecommunication apparatuses), a generation unit configured to generate, on the basis of the information received by the reception unit, an image indicative of a state of telecommunication between a certain terminal apparatus (for example, a first telecommunication apparatus) and another terminal apparatus (for example, another telecommunication apparatus) and a state of telecommunication between a plurality of other telecommunication apparatuses, and a display unit configured to display the image generated by the generation unit.

By doing this, a user can recognize a state of telecommunication among the terminal apparatuses from the displayed image. In short, the overall state of telecommunication among multiple points can be recognized more easily.

It is to be noted that display of such an image as described above may be performed by the terminal apparatus (for example, the first telecommunication apparatus) or may be performed by an apparatus other than the terminal apparatus. In particular, the information processing apparatus described above may be a certain terminal apparatus (for example, the first telecommunication apparatus) or an apparatus other than the terminal apparatus.

Further, the other terminal apparatus described above (the different telecommunication apparatus) may include a second terminal apparatus (for example, a second telecommunication apparatus) and a third terminal apparatus (a third telecommunication apparatus). The number of other terminal apparatuses is desirably set if it is two or more.

<Appearance of Terminal Apparatus>

An example of an appearance of such a terminal apparatus as described above is depicted in FIG. 1. A terminal apparatus 100 depicted in FIG. 1 is a mode of an information processing apparatus (or a telecommunication apparatus) to which the present technology is applied and is a terminal apparatus operated by a user who is to communicate in a communication system in which telecommunication among multiple points (three or more terminal apparatuses) is possible.

As depicted in FIG. 1, a housing 101 of the terminal apparatus 100 has a shape of a table, and an upper face 101A of the housing 101 is used as an input interface. An arm 102 is provided at an upper portion of the housing 101, and an imaging unit 111, another imaging unit 112, and a projection unit 122 are provided on the arm 102. Further, a display unit 121 is provided on a front face of the housing 101. A user 131 operates the terminal apparatus 100 to communicate with a user of another terminal apparatus 100.

The imaging unit 111 captures an image around the user 131 (especially the face) who operates the terminal apparatus 100. The captured image obtained (captured image including the user 131) is transmitted to the other terminal apparatus 100. Since this communication system allows telecommunication among multiple points (three or more terminal apparatuses 100), the captured image Generated by this terminal apparatus 100 can be supplied to a plurality of points (two or more terminal apparatuses 100).

The display unit 121 displays an image indicative of a state and so forth of other users. For example, a captured image captured by another terminal apparatus 100 and including a user of the other terminal apparatus 100 is supplied to the terminal apparatus 100 and displayed on the display unit 121. Since this communication system allows telecommunication among multiple points (three or more terminal apparatuses 100), to this terminal apparatus 100, captured images generated individually by a plurality of other terminal apparatuses 100 (captured images including individual users (also referred to as other users)) can be supplied in short, the display unit 121 can display captured images generated individually by a plurality of other terminal apparatuses 100.

Further, though not depicted, a microphone and a speaker are provided on the housing 101, and also sound information can be transferred among and outputted by the terminal apparatuses 100 similarly to the image described hereinabove. By transferring images and sound in such a manner as described above, communication among (users of) the terminal apparatuses 100 is implemented. In short, communication among multiple points is implemented.

Furthermore, also information other than images and sound such as shared data can be transferred among the terminal apparatuses 100. Various content data such as, for example, text data, table data, presentation data, moving images, still images, and slideshows can be transferred among the terminal apparatuses 100. For example, also it is possible for the display unit 121 to display the data transferred among the terminal apparatuses 100 in this manner (data supplied among the plurality of terminal apparatuses 100) and utilize the data as materials and so forth for communication.

The projection unit 122 projects an image on the upper face 101A of the housing 101. For example, the projection unit 122 projects an image of an input interface such as a keyboard or a GUI (Graphical User Interface). The imaging unit 112 captures an image of a region 101B that is indicated by a broken line frame on the upper face 101A and to which such an image as just described is projected. From this captured image, an operation made by the user 131 on the projected image of the input interface is detected, and information, an instruction, or the like according to the detected operation is accepted as an input. In short, the region 101B of the upper face 101A functions as a virtual input interface. It is to be noted that the image that is projected by the projection unit 122 is desirably selected and may be any other than an image of an input interface. Naturally, an image of an input interface and another image may exist in a mi ed manner. For example, information transmitted from another terminal apparatus 100 may be projected as an image to the region 101B by the projection unit 122.

<Display of Image Indicative of State of Telecommunication>

In such a terminal apparatus 100 as described above, the display unit 121 displays not only captured images transmitted from other terminal apparatuses 100 that are telecommunication partners (images of other users) but also an image indicative of a state of telecommunication among the terminal apparatuses 100. In particular, the display unit 121 displays an image indicative of a state of telecommunication between this terminal apparatus 100 (for example, a first telecommunication apparatus) and another terminal apparatus 100 (for example, a second telecommunication apparatus or a third telecommunication apparatus) and a state of telecommunication (also called feeling of connection) between a plurality of other terminal apparatuses 100 (for example, the second telecommunication apparatus and the third telecommunication apparatus).

By doing this, the user can recognize the state of telecommunication among the terminal apparatuses from the displayed image. In short, the user can recognize the overall state of telecommunication among multiple points more easily.

For example, the image may include a first content that connects a first position indicative of the first telecommunication apparatus that is this terminal apparatus 100 and a second position indicative of the second telecommunication apparatus that is one of the other terminal apparatuses 100 to each other and a second content that connects a third position indicative of the third telecommunication apparatus that is another one of the other terminal apparatuses 100 and the second position to each other.

By doing this, from the first content included in the displayed image, the user can more easily recognize the state of telecommunication between this terminal apparatus 100 and the other terminal apparatus 100. Further, from the second content included in the displayed image, the user can more easily recognize the state of telecommunication between the other terminal apparatuses 100. In short, the overall state of telecommunication among multiple points can be recognized more easily.

It is to be noted that the first content and the second content described above may each be any content. For example, they may be images of a "road." In other words, the first content may be an image of a road that connects a first point and a second point to each other, and the second content may be an image of a road that connects the second point and a third point to each other.

Further, locations of the first to third points in the displayed image are desirably set. For example, the first point may be a lower end of the image. Further, for example, the first to third points may be positions of contents (for example, images of a "house") indicating respective telecommunication apparatuses.

<State of Telecommunication (Feeling of Connection)>

A state of telecommunication (feeling of connection) is information representative of ease of communication and is information that can be represented, for example, using a parameter representative of a telecommunication environment, a parameter representative of a connection situation, or a like parameter. The parameter representative of a telecommunication environment includes a parameter related to a telecommunication path (network, telecommunication device, and so forth) such as, for example, a telecommunication speed and a bandwidth. The parameter representative of a connection situation includes parameters related to transfer of data such as, for example, a state of a session that is a state in which telecommunication for communicating between terminal apparatuses 100 can be performed, permission/inhibition of telecommunication indicative of whether or not transfer of data can be performed, a stability degree of telecommunication indicative of a fluctuation of a rate, and a delay amount indicative of a transmission time period of data. Naturally, the parameter representative of the state of telecommunication (feeling of connection) may be any parameter only if it can represent ease of communication and is not restricted to the examples described above.

<Presentation of State of Session>

Figure 2:
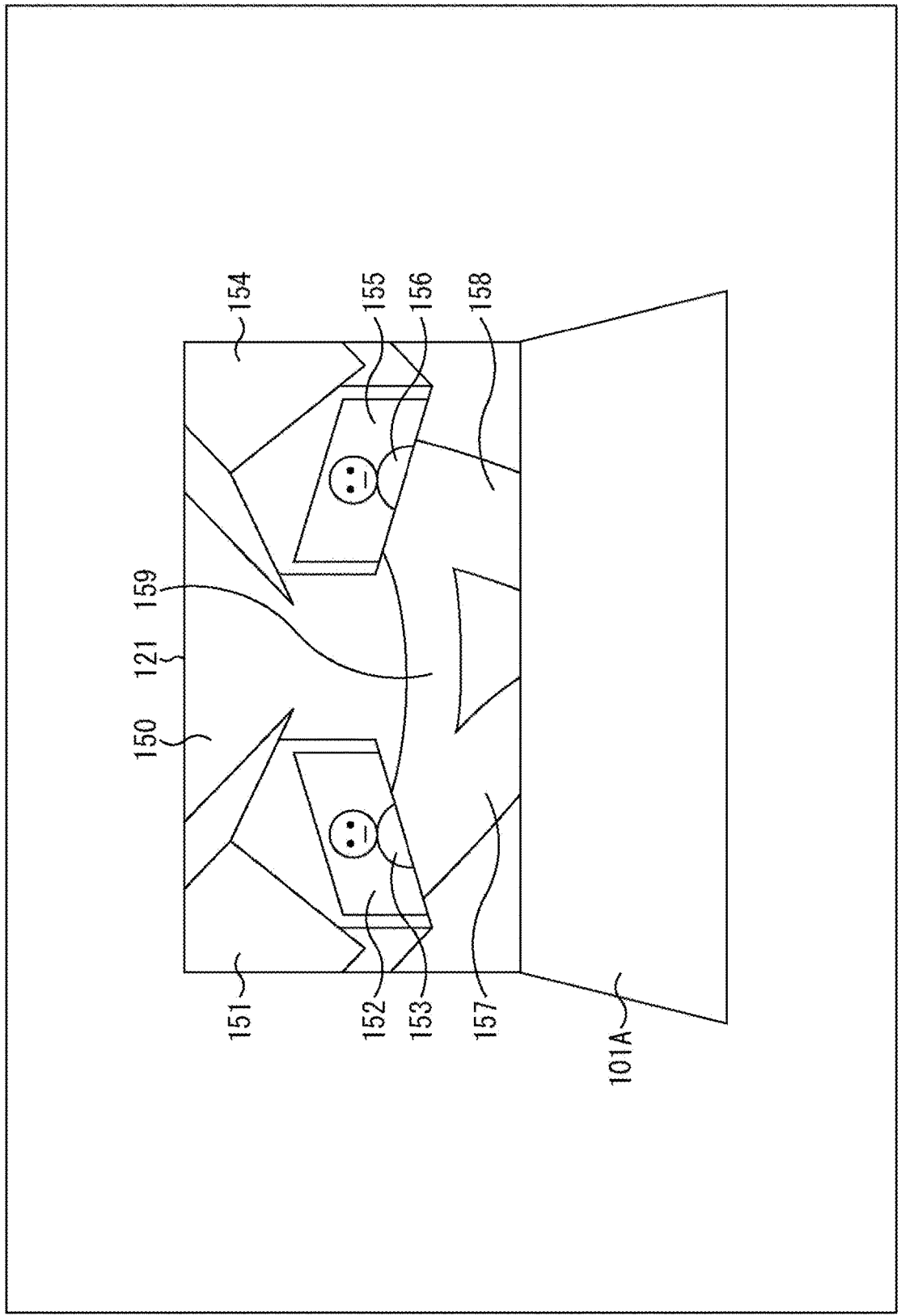
FIG. 2 is a view depicting an example of image display.

For example, as the feeling of connection, a state of a session that is a state in which telecommunication for communicating between telecommunication apparatuses can be performed may be presented. FIG. 2 depicts a manner in which an image 150 is displayed on the display unit 121. The image 150 is an image that three-dimensionally represents multiple points for performing telecommunication (communication) in a virtual space and further represents feelings of connection among the multiple points in the virtual space.

For example, in the case of the image 150 of the example of FIG. 2, a house 151 and another house 154 are arranged three-dimensionally in the virtual space. The house 151 indicates a point of a user 153 (namely, the terminal apparatus 100 of the user 153) who is a telecommunication partner (partner of communication). In short, for example, in the case where the terminal apparatus 100 of the user 153 is a second telecommunication apparatus, the house 151 indicates a second point. Meanwhile, the house 154 indicates a point of a user 156 (namely, the terminal apparatus 100 of the user 156) of another telecommunication partner (another partner of the communication). In short, for example, in the case where the terminal apparatus 100 of the user 156 is a third telecommunication apparatus, the house 154 indicates a third point. In front of the house 151, a telecommunication destination image 152 that is a captured image in which the user 153 is imaged is displayed. In front of the house 154, a telecommunication destination image 155 that is a captured image in which the user 156 is imaged is displayed.

Further, in the image 150, a state in which a session between points is established is indicated as a road in the virtual space. For example, a road 157 that couples (connects) a lower end (first position) of the image 150 and the house 151 is a first content that connects the first position and the second position to each other and indicates a state in which a session between this terminal apparatus 100 and the terminal apparatus 100 of the user 153 is established. Further, a road 158 that connects the lower end of the image 150 and the house 154 to each other indicates a state in which a session between this terminal apparatus and the terminal apparatus 100 of the user 156 is established. Furthermore, a road 159 that connects the house 151 and the house 154 is a second content that connects the third position and the second position to each other and indicates a state in which a session between the terminal apparatus 100 of the user 153 and the terminal apparatus 100 of the user 156 is established (state in which telecommunication for communicating between the telecommunication apparatuses can be performed).

It is to be noted that, in the case where a session is disconnected, namely, in the case of a state in which telecommunication for communicating between telecommunication apparatuses cannot be performed, the road in the virtual space corresponding to the session is erased (is not displayed). For example, in the case where the session between this terminal apparatus 100 and the terminal apparatus 100 of the user 153 is disconnected, the road 157 is not displayed. Further, in the case where the session between this terminal apparatus 100 and the terminal apparatus 100 of the user 156 is disconnected, the road 158 is not displayed. Furthermore, in the case where the session between the terminal apparatus 100 of the user 153 and the terminal apparatus 100 of the user 156 is disconnected, the road 159 is not displayed.

In this manner, in the image 150, a state of a session (whether or not it is a current state that telecommunication for communicating between telecommunication apparatuses can be performed) is indicated by presence or absence of a road in the virtual space. Accordingly, states of sessions among terminal apparatuses 100 that perform telecommunication can be recognized more easily. In short, the overall state of sessions among multiple points can be recognized more easily. By this, for example, in the case where a state in which a session is not established as yet exists, an apparatus that is a cause of this can be estimated more easily.

For example, if none of the road 157 and the road 159 is displayed, then it can be estimated that the terminal apparatus 100 of the user 153 (terminal apparatus corresponding to the house 151) is the cause of session disconnection (session non-establishment). Further, if none of the road 158 and the road 159 is displayed, then it can be estimated that the terminal apparatus 100 of the user 156 (terminal apparatus corresponding to the house 154) is the cause of the session disconnection (session non-establishment). Furthermore, if none of the road 157 and the road 158 is displayed, then it can be estimated that this terminal apparatus 100 is the cause of the session disconnection (session non-establishment). Further, if none of the roads 157 to 159 is displayed, then it can be estimated that the server is the cause of the session disconnection (session non-establishment).

For example, in the case where only a state of telecommunication between this terminal apparatus 100 and the terminal apparatuses 100 of the telecommunication partners is displayed on the display unit 121, since a state of telecommunication between the terminal apparatuses 100 of the telecommunication partners cannot be recognized, it is difficult to specify such a cause of session disconnection (session non-establishment) as described above. Also, in the case where only a state of telecommunication between the terminal apparatuses 100 of the telecommunication partners is displayed on the display unit 121, since a state of telecommunication between this terminal apparatus 100 and the terminal apparatuses 100 of the telecommunication partners cannot be recognized, it is difficult to specify a cause of such session disconnection (session non-establishment) as described above.

In the image 150, since both a state of telecommunication between this terminal apparatus 100 and the terminal apparatuses 100 of the telecommunication partners and a state of telecommunication between the terminal apparatuses 100 of the telecommunication partners are indicated, an apparatus that is the cause of the session disconnection (session non-establishment) can be estimated easily as described above.

It is to be noted that, since such information regarding states of sessions as described above is supplied to the terminal apparatus 100 that performs telecommunication and is presented to the user 131 who is to communicate, the user 131 can immediately respond to a change in state of the sessions in the communication.

For example, in the case where the terminal apparatus 100 of a certain telecommunication partner causes disconnection of a session, if it can be estimated more easily that the cause of the session disconnection is the terminal apparatus 100 as described above, then the user 131 can give up the communication with the user of the terminal apparatus 100 and can concentrate on communication with another telecommunication partner (for example, the user 131 can omit an unnecessary call, an unnecessary restoration work, and so forth) until the session is resumed. Further, for example, in the case where this terminal apparatus 100 causes disconnection of the session, if it can be estimated more easily that the cause of the session disconnection is this terminal apparatus 100, then the user 131 can concentrate on a work for re-establishing a session at an earlier stage (for example, can omit an unnecessary call or the like).

<Presentation of Stability Degree of Telecommunication>

Further, as the feeling of connection, the stability degree of telecommunication indicative of a fluctuation of a rate may be presented. For example, the stability degree of telecommunication may be indicated as a thickness of a road (namely, a width of a content). For example, in the case where the stability degree of telecommunication is low due to a cause of specifications of an application, a network failure, or the like, namely, in the case where the fluctuation of the rate is great, the road corresponding to the telecommunication may be represented thinner in the image 150. In short, for example, as the stability of telecommunication becomes higher (as the fluctuation of the rate becomes smaller), the road corresponding to the telecommunication may be represented thicker, and as the stability degree of telecommunication becomes lower (as the fluctuation of the rate becomes greater), the road corresponding to the telecommunication may be represented thinner.

For example, the thickness of the road 157 may indicate a stability degree of telecommunication between this terminal apparatus 100 and the terminal apparatus 100 of the user 153. Further, the thickness or the road 158 may indicate a stability degree of telecommunication between this terminal apparatus 100 and the terminal apparatus 100 of the user 156. Furthermore, the thickness of the road 159 may indicate a stability degree of telecommunication between the terminal apparatus 100 of the user 153 and the terminal apparatus 100 of the user 156.

This makes it possible to recognize the stability degree of telecommunication between the terminal apparatuses 100 more easily (more intuitively). In short, this makes it possible to recognize the overall stability degree of telecommunication among multiple points more easily.

It is to be noted that, since such information regarding the stability degree of telecommunication as described above is supplied to the terminal apparatus 100 that performs telecommunication and is presented to the user 131 who is to communicate, the user 131 can immediately respond to (a change of) the stability degree of the telecommunication in the communication.

For example, in the case where the stability degree of telecommunication with the terminal apparatus 100 of a certain telecommunication partner is low (or drops), the user 131 can reduce the information amount to be transferred by the telecommunication (for example, reduce the conversation or the like) and perform recording of the transferred information more frequently. Further, in the case where the stability degree of telecommunication between the terminal apparatuses 100 of the telecommunication partners is low (or drops), the user 131 can try communication with both of the telecommunication partners so as to assist the communication between the telecommunication partners (for example, by interrupting the conversion or the like).

<Presentation of Interruption State>

Figure 3:
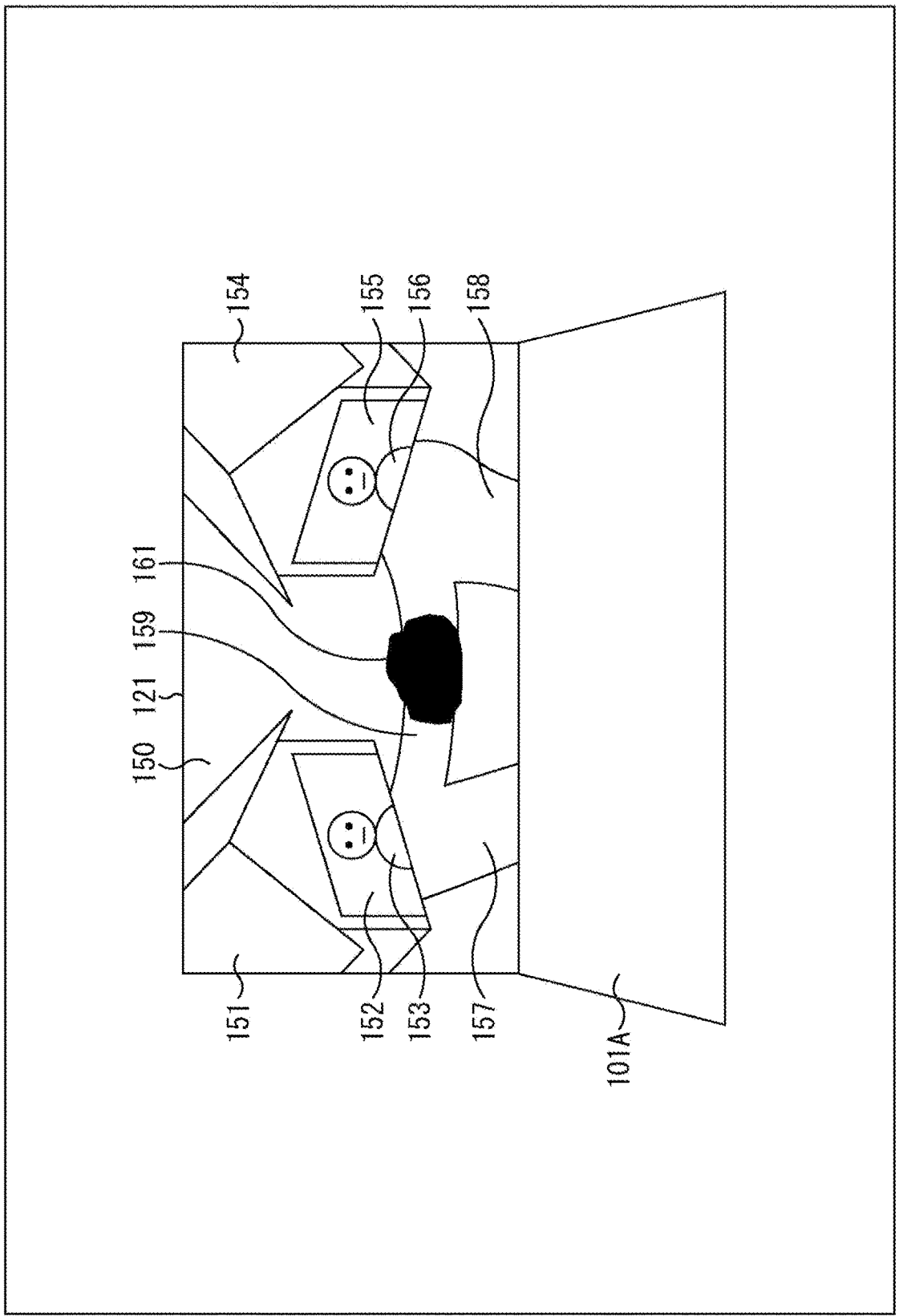
FIG. 3 is a view depicting another example of image display.

Further, as the feeling of connection, it may be presented whether or not the telecommunication is in an interruption state in which transfer of all data is disabled. For example, the state in which telecommunication is interrupted (state in which transfer of all data is disabled) may be indicated as cutting of a road or an obstacle placed on a road as depicted in FIG. 3. In the case of the example of FIG. 3, in the image 150, a rock 161 is placed on the road 159 in the virtual space. The rock 161 blocks the road 159 and indicates that telecommunication in a session indicated by the road 159 is interrupted. For example, in the case where telecommunication between the terminal apparatuses 100 is interrupted by a cause of specifications of an application, a failure of the network, or the like (in the case where transfer of all data is disabled between the terminal apparatuses 100), in the image 150, such an obstacle as the rock 161 is placed on a road corresponding to the session.

This makes it possible to more easily recognize whether or not each session is in a non-telecommunicable state (whether or not transfer of all data is in a disabled state). In short, whether or not telecommunication among multiple points is in a disabled state can be wholly recognized more readily.

It is to be noted that, where information regarding whether or not it is in such a non-telecommunicable state as described above is supplied to the terminal apparatus 100 that is to perform telecommunication and is presented to the user 131 who is to communicate, the user 131 can immediately respond to (a change of) whether or not it is in a non-telecommunicable state in communication.

For example, in the case where telecommunication between the terminal apparatuses 100 of the telecommunication partners is interrupted as depicted in FIG. 3, the user 131 can try communication with both of the telecommunication partners so as to assist the communication between the telecommunication partners (for example, can relay the conversation).

<Presentation of Communication Delay Amount>

Figure 4:
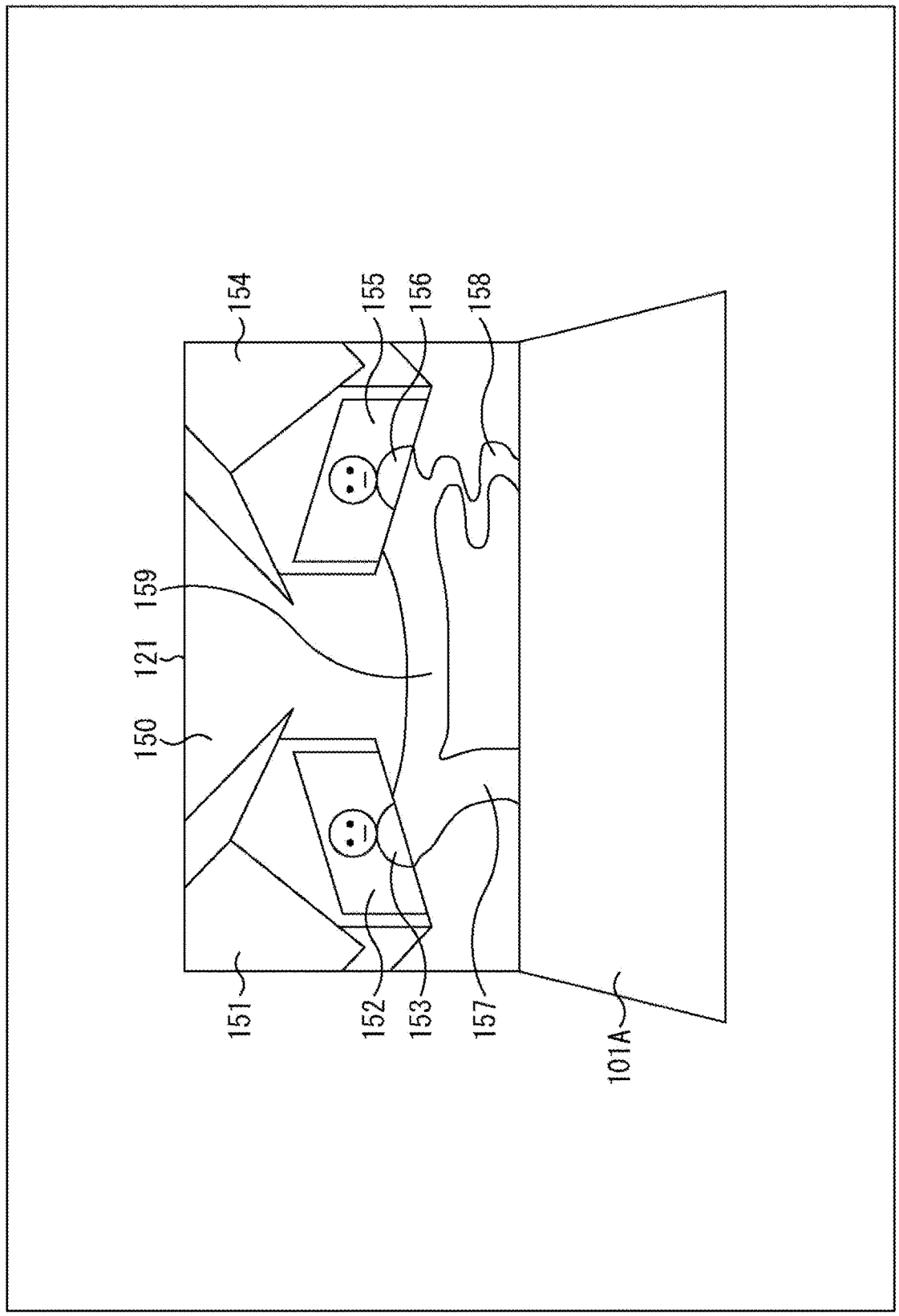
FIG. 4 is a view depicting a further example of image display.

Further, as the feeling of connection, the delay amount of telecommunication indicative of a transmission time period of data may be presented. For example, a delay amount of telecommunication may be indicated as a length of a road (distance, namely, a length of a content) as depicted in FIG. 4. In the case of the example of FIG. 4, in the image 150, the road 158 the virtual space is curved such that the length thereof is represented long in comparison with the other roads (road 157 and road 159). This indicates that the delay amount of telecommunication (transmission time period of data) between this terminal apparatus 100 and the terminal apparatus 100 of the user 156 is great in comparison with the delay amount of telecommunication (transmission time period of data) between the other terminal apparatuses 100. In short, in the image 150, the delay amount (transmission time period of data) is indicated as a length of a road (period of travel time upon travel on the road).

By doing this, it is possible to more easily recognize the delay amount of each telecommunication. In short, it is possible to recognize the overall delay mount of telecommunication between multiple points more easily (more intuitively). Accordingly, occurrence of a time lag or an error and so forth in each telecommunication can be estimated more easily.

It is to be noted that, where such information regarding the delay mount of telecommunication as described above is supplied to the terminal apparatus 100 that is to perform telecommunication and is presented to the user 131 who is to communicate, the user 131 can immediately respond to (a change of) the delay amount of the telecommunication in the communication.

For example, as depicted in FIG. 4, in the case where the delay amount of telecommunication with the terminal apparatus 100 of the user 156 increases, the user 131 can cause the communication of the overall system to proceed smoothly by reducing also the speed of communication with the user 153 so as to adjust to the amount of delay (for example, by reducing the frequency of conversation) or like means.

<Presentation by Moving Body>

Figure 5:
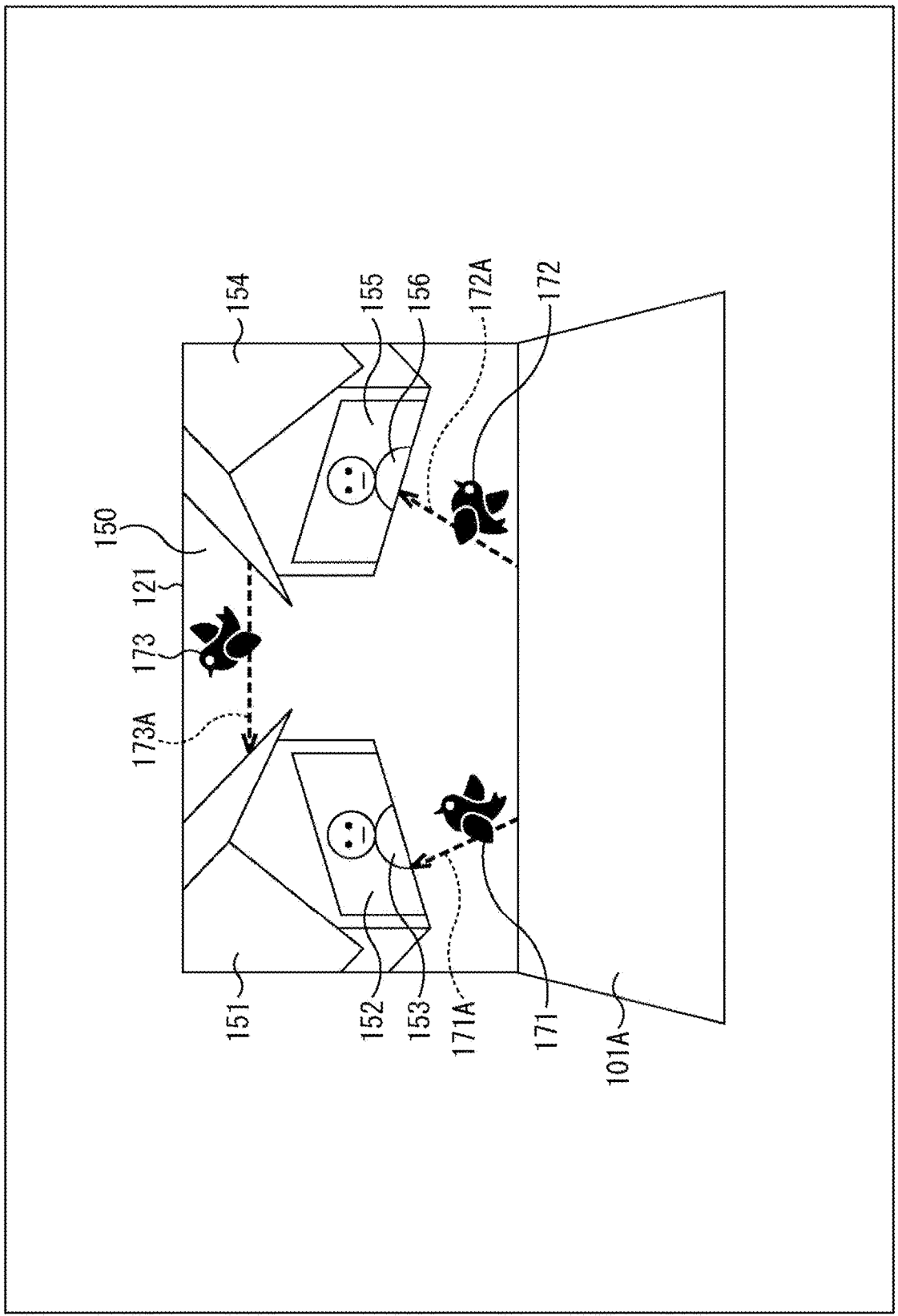
FIG. 5 is a view depicting a further example of image display.

It is to be noted that the image that indicates a feeling of connection is desirably set and may be other than the example (road) described above. For example, a feeling of connection may be indicated by a movement of a moving body as depicted in FIG. 5. In particular, the feeling of connection between this terminal apparatus 100 and another terminal apparatus 100 may be indicated by a moving body that moves between the lower end of the image 150 (first point) and a picture pattern indicative of the other terminal apparatus 100 (for example, the house 151 (second point), the house 154 (third point), or the like), and the feeling of connection between a plurality of other terminal apparatuses 100 may be indicated as a moving body that moves between picture patterns indicating the other terminal apparatuses 100 (for example, between the second point and the third point).

In the case of the example of FIG. 5, in the image 150, a feeling of connection in each telecommunication is indicated by a movement (going back and forth) of a bird. For example, in the image 150, a feeling of connection between this terminal apparatus 100 and the terminal apparatus 100 of the user 153 is indicated by a bird 171 that moves as indicated by a broken line arrow mark 171A. Further, a feeling of connection between this terminal apparatus 100 and the terminal apparatus 100 of the user 156 is indicated by a bird 172 that moves as indicated by a broken line, arrow mark 172A. Further, a feeling of connection between the terminal apparatus 100 of the user 153 and the terminal apparatus 100 of the user 156 is indicated by a bird 173 that moves as indicated by a broken line arrow mark 173A.

Also, by such a moving body as described above, similarly as in the case of a road described hereinabove, a feeling of connection between terminal apparatuses 100 can be represented. Accordingly, the overall feeling of connection between the multiple points can be recognized more easily.

It is to be noted that a state of a session (whether or not a session is established) that is a state in which telecommunication for communicating between telecommunication apparatuses can be performed may be indicated by whether or not a bird as such a moving body is displayed. For example, in the image 150 of FIG. 5, a state in which a session between this terminal apparatus 100 and another terminal apparatus 100 is established is indicated as a moving body that moves between the lower end of the image 150 and a picture pattern indicative of the other terminal apparatus 100 (for example, the house 151, the house 154, or the like), and a state in which a session between a plurality of other terminal apparatuses 100 is established may be indicated as a moving body that moves between picture patterns indicative of the other terminal apparatuses 100 (for example, the houses 151 and 154 or the like).

Also, by such a moving body as described above, a state of a session between the terminal apparatuses 100 can be represented similarly as in the case of a road described hereinabove. Accordingly, the overall state of sessions among multiple points can be recognized more easily.

Further, at least one of a stability degree of telecommunication indicative of the fluctuation of the rate, a non-telecommunicable state in which transfer of all data is disabled, and a delay amount of telecommunication indicative of a transmission time period of data may be indicated by a manner of movement of a bird corresponding to each session. For example, a stability degree of telecommunication may be indicated by a degree of meandering of a bird. Further, the fact that telecommunication is interrupted may be indicated by movement of a bird toward any other than the house of a telecommunication partner. Furthermore, a delay amount of telecommunication may be represented by a speed of movement of a bird. Further, a stability of telecommunication, a non-telecommunicable state of a session, a delay amount of telecommunication, and so forth may be indicated by a size, a shape, a color, a pattern, and so forth of a bird, instead of the manner of movement of a bird.

Also, by such a manner of movement of a moving body, a stability of telecommunication, a non-telecommunicable state of a session, a delay amount of telecommunication, and so forth between the terminal apparatuses 100 can be represented similarly as in the case of a road described hereinabove. Accordingly, the overall state between the multiple points can be recognized more easily.

It is to be noted that a direction of a movement of a bird may be reverse to that of the example of FIG. 5 (reverse to each of broken line arrow marks 171A to 173A), and the movement may be a back-and-forth movement between points. Further, the moving body is desirably set and is not restricted to the example of a bird described above. For example, the moving body may be a moving body like a shining ball.

In this manner, also in the case of a moving body, where such an image 150 as described above is supplied to the terminal apparatus 100 that performs telecommunication and is presented to the user 131 who is to communicate, the user 131 can immediately respond to (a change of) the feeling of connection in the communication similarly as in the case of a road describe hereinabove.

<Presentation by Symbol>

Figure 6:
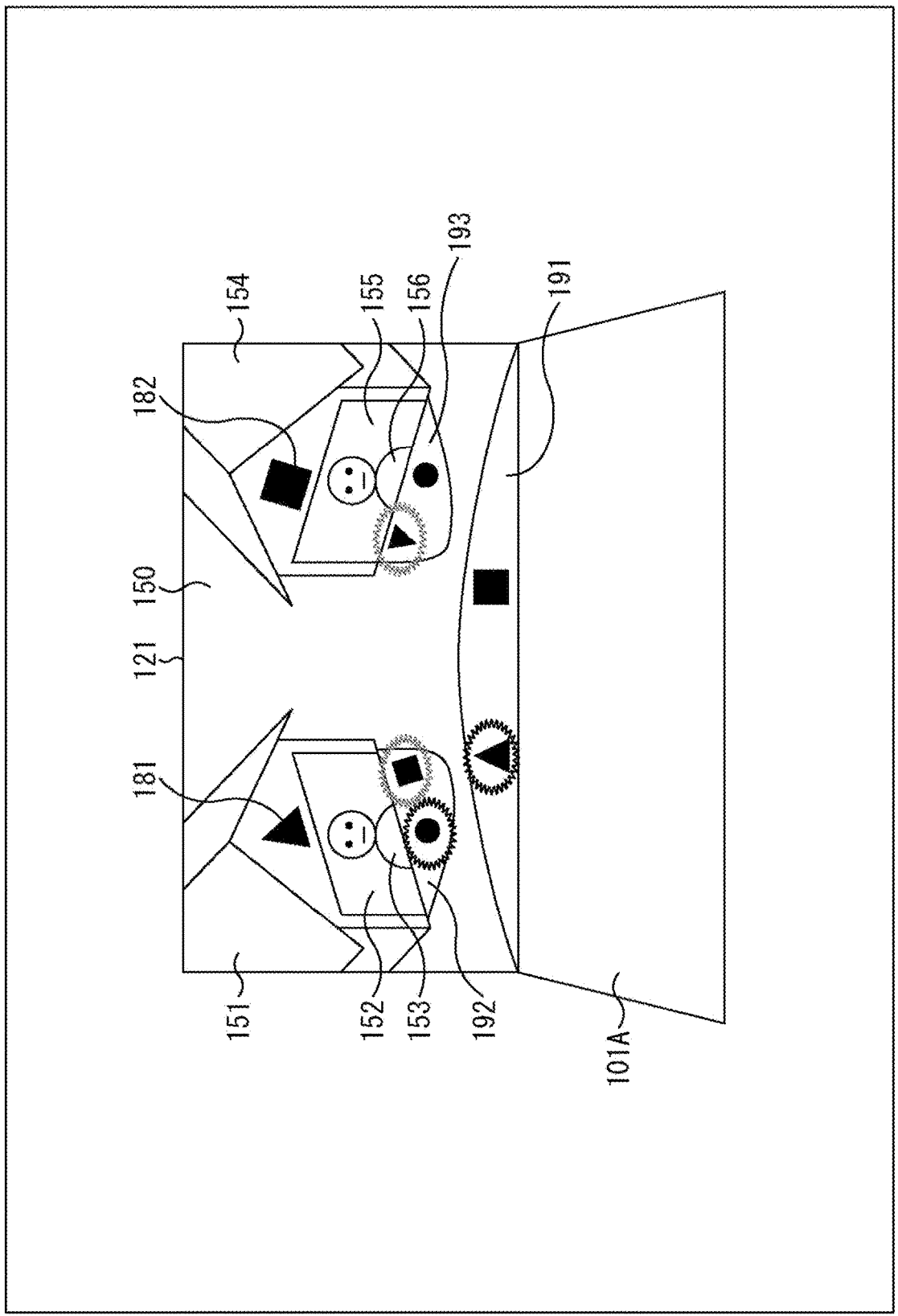
FIG. 6 is a view depicting a further example of image display.

Further, a feeling of connection may be indicated by a symbol as depicted, for example, in FIG. 6. In other words, in the image 150, a feeling of connection of each telecommunication may be indicated using a symbol of the terminal apparatus 100 that performs telecommunication. By doing this, the overall feelings of connection between the multiple points can be recognized more easily similarly as in the case of a road described hereinabove.

In the case of the example of FIG. 6, in the image 150, a triangular symbol 181 is displayed on the telecommunication destination image 152 of the house 151. The symbol 181 is a picture (picture pattern) for identifying the house 151 (namely, the terminal apparatus 100 of the user 153). Further, on the telecommunication destination image 155 of the house 154, a quadrangular symbol 182 is displayed. The symbol 182 is a picture (picture pattern) for identifying the house 154 (namely, the terminal apparatus 100 of the user 156). Similarly, also to this terminal apparatus 100, a circular symbol is allocated.

In the case of the example of FIG. 6, a symbol displaying region 191 for this terminal apparatus 100 is provided in a proximity of the lower end of the image 150. Further, on a lower side of the house 151, a symbol displaying region 192 for the terminal apparatus 100 of the user 153 is provided. Furthermore, on a lower side of the house 154, a symbol displaying region 193 for the terminal apparatus 100 of the user 156 is provided.

Then, where a triangular symbol is displayed in the symbol displaying region 191 and a circular symbol is displayed in the symbol displaying region 192, it is indicated that a session is established between this terminal apparatus 100 and the terminal apparatus 100 of the user 153 (a state is established in which telecommunication for communicating between the telecommunication apparatuses can be performed). Further, where a quadrangular symbol is displayed in the symbol displaying region 191 and a circular symbol is displayed in the symbol displaying region 193, it is indicated that a session is established between this terminal apparatus 100 and the terminal apparatus 100 of the user 156. Furthermore, where a quadrangular symbol is displayed in the symbol displaying region 192 and a triangular symbol is displayed in the symbol displaying region 193, it is indicated that a session is established between the terminal apparatus 100 of the user 153 and the terminal apparatus 100 of the user 156. In short, a symbol of a telecommunication partner of an established session is displayed in the symbol displaying region.

In this manner, a state of a session between this terminal apparatus 100 and another terminal apparatus 100 (whether or not a session is established, for example) and a state of a session between a plurality of other terminal apparatuses 100 may be indicated using symbols for identifying each of the terminal apparatuses 100. By doing this, a state of a session between the individual terminal apparatuses 100 can be represented similarly as in the case of a road described hereinabove. Accordingly, the overall state of sessions between multiple points can be recognized more easily.

It is to be noted that a state of a session (whether or not a session is established, for example) may be indicated by turning-on, turning-off, blinking, or a pattern of blinking of a symbol, a color, a brightness, a density, or a size of a turned on (blinking) symbol, a combination of them, a combination with some other displaying method, or the like.

Similarly, at least one of a stability degree of telecommunication indicative of the fluctuation of the rate, a non-telecommunicable state in which transfer of all data is disabled, and a delay amount of telecommunication indicative of a transmission time period of data nay be indicated by such (a displaying state of) a symbol as described hereinabove corresponding to each session. Such information may be indicated, for example, by display, turning-on, turning-off, blinking, or a pattern of blinking of a symbol, a color, a brightness, a density, or a size of a turned on (blinking) symbol, a combination of them, a combination with some other displaying method, or the like.

By doing this, such information as described above (a state of a session, a stability degree of telecommunication, a non-telecommunicable state of a session, a delay amount of telecommunication, and so forth) regarding between the terminal apparatuses 100 can be represented similarly as in the case of a road described hereinabove. Accordingly, the overall state between the multiple points can be recognized more easily.

Also, in the case where a symbol is used in this manner, since such an image 150 as described above is supplied to the terminal apparatus 100 that performs telecommunication and is presented to the user 131 who is to communicate, the user 131 can immediately respond to (a change of) the feeling of connection in the communication similarly as in the case of a road described hereinabove.

<Display of Image Indicative of State of Communication>

Further, in such a terminal apparatus 100 as described above, the display unit 121 may display an image indicative of a state of communication of this terminal apparatus 100 with another terminal apparatus 100 and a state of communication among a plurality of other terminal apparatuses 100.

The communication here indicates mutual understanding between users performed by exchange of information utilizing telecommunication between the terminal apparatuses 100 described hereinabove. This exchanged information includes, for example, a captured image obtained by imaging a user, sound of a user, shared data, and so forth. However, the communication does not merely indicate transfer of data but indicates mutual understanding using the transferred data. In short, for example, in the case of a TV conferencing system, the communication indicates contents of the conference performed using the system. Further, the state of communication indicates whether or not communication is performed.

In the case of telecommunication connecting multiple points, since it is possible to send information to a plurality of telecommunication partners, even in the case where it is desired to communicate with a specific telecommunication partner, it is possible to implement the communication by sending information (transmitting data) to all telecommunication partners. In short, there is no necessity to restrict the transmission destination of data to partners of communication. In other words, even if data is transmitted to the terminal apparatus 100 of the user itself, the partner of the communication may not be the user itself. For example, even if a certain telecommunication partner performs calling or utterance and the user itself confirms the calling or utterance (even if an image or sound is outputted from the terminal apparatus 100 of the user itself), the calling or utterance may not be destined for the user itself (the calling or utterance may possibly be destined for another telecommunication partner).

Therefore, a partner of communication that is performed utilizing telecommunication between terminal apparatuses 100 is specified (or estimated) and the state of the communication performed between the terminal apparatuses 100 is indicated as an image. For example, the state of communication between this terminal apparatus 100 and another terminal apparatus 100 and the state of communication between a plurality of other terminal apparatuses 100 are displayed as in the image 150 depicted in FIG. 7. The image 150 of the example of FIG. 7 can display the state of communication between this terminal apparatus 100 and the terminal apparatus 100 of the user 153, the state of communication between this terminal apparatus 100 and the terminal apparatus 100 of the user 156, and the state of communication between the terminal apparatus 100 of the user 153 and the terminal apparatus 100 of the user 156.

In other words, the terminal apparatuses 100 that perform communication are indicated by such display as just described.

The state of communication may be indicated, for example, by a moving body. For example, in the case of FIG. 7, a person. 201 is walking (moving) from the house 154 toward the house 151 on the road 159. It is indicated by the person 201 that communication is being performed. Further, it is indicated by a position or a movement (moving source and moving destination) of the person 201 that the users who are performing this communication are the user 156 and the user 153. It is to be noted that it is indicated more particularly by the movement (moving source and moving destination) of the person 201 that a direction of the communication is from the user 156 toward the user 153 (for example, that a call has been made from the user 156 to the user 153).

The method of specifying (estimating) a partner of communication is desirably set. For example, a captured image of a user may be analyzed to specify to which portion of the display unit 121 the face of the user is directed and specify (estimate) the user of a house (telecommunication destination image) displayed at the portion (direction to which the face of the user is oriented) as the partner of the communication. Further, it may be specified by eye tracking to which portion of the display unit 121 the gaze of the user is directed to specify the user of a house (telecommunication destination image) displayed at the portion (direction to which the gaze of the user is set) as the partner of the communication. Furthermore, a directional microphone may be utilized to specify an utterance direction of the user and specify (estimate) the user of a house (telecommunication destination image) displayed in the utterance direction as the partner of the communication.

This makes it possible to recognize the state of communication performed between (the users of) the individual terminal apparatuses 100 more easily (without the necessity for a cumbersome work such as to switch images). In other words, by such display as described above, the terminal apparatuses 100 that perform communication are indicated. Accordingly, it can be recognized more easily between which ones of (the users of) the terminal apparatuses 100 communication is being performed. In short, the overall state of communication between multiple points can be recognized more easily.

Further, since such information regarding a state of communication as described above is supplied to the terminal apparatus 100 that is to perform telecommunication and is presented to the user 131 that is to communique, the user 131 can immediately respond to a change in state of the communication.

For example, since the user 131 can easily recognize whether or not the communication is destined for the user itself, the user can omit a response if the call is directed to any other than the user itself. Further, the user can refrain from calling to any partner of telecommunication who is performing communication (in the case of FIG. 7, the user 153 and the user 156) so as not to disturb the communication being performed between the telecommunication partners.

Furthermore, since a telecommunication partner who is to communicate can be specified, the user 131 can recognize what kind of information is obtained by which telecommunication partner more easily (without the necessity for such a cumbersome work as to switch images). For example, in the case where the state of communication between telecommunication partners cannot be recognized, it cannot be recognized what kind of information is obtained by which telecommunication partner, and therefore, in the case where the user 131 receives a question from a telecommunication partner, it is difficult for the user 131 to recognize on what information the question is based and a case possibly occurs that the user 131 cannot perform communication smoothly. By making it possible to also recognize the state of communication between the telecommunication partners as in the example of FIG. 7, for example, in the case where, from a telecommunication partner, a question or the like based on communication performed by the telecommunication partner is issued to the user 131, the user 131 can easily recognize on what information the question is based and therefore can make a response more appropriately.

Figure 7:
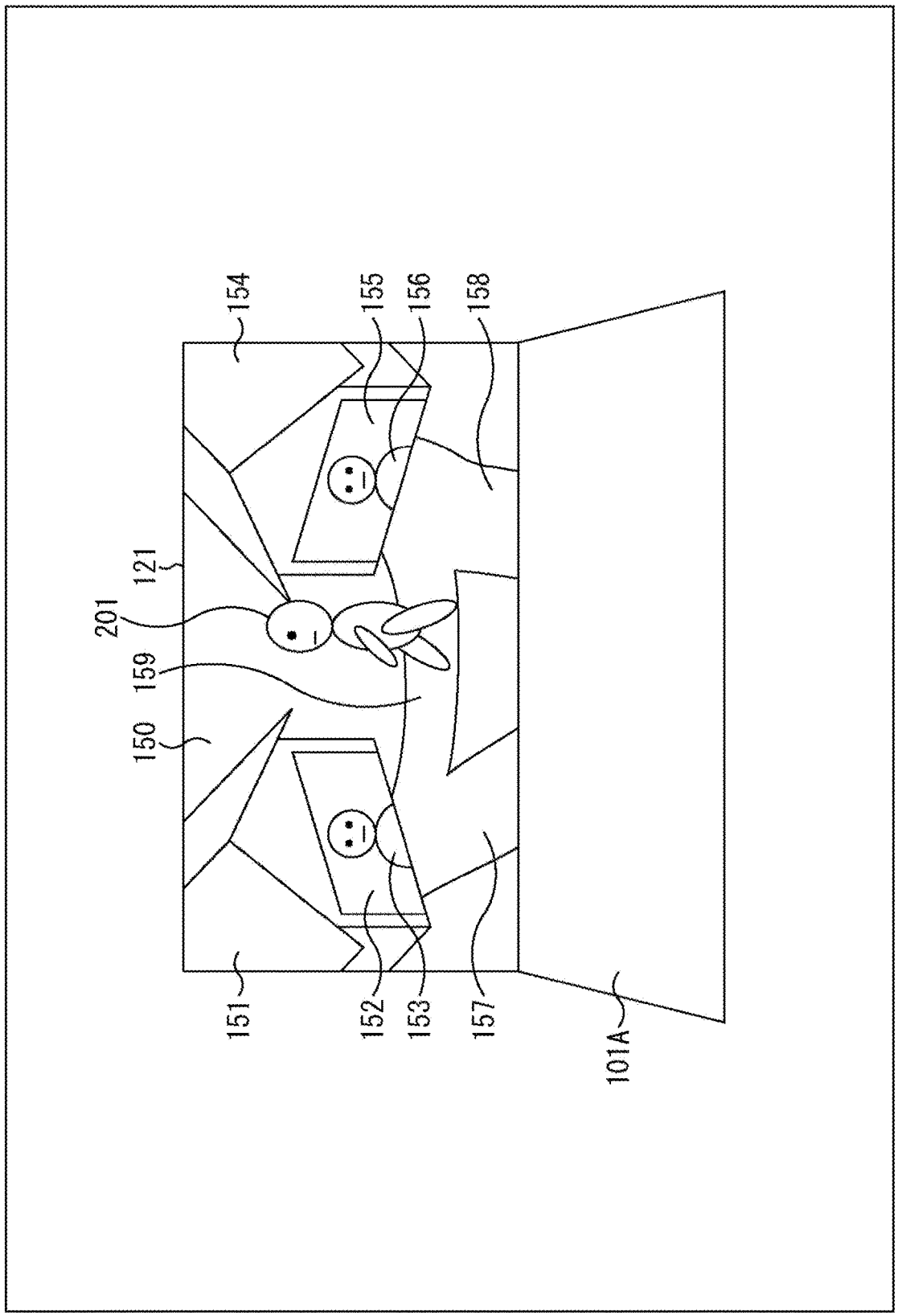
FIG. 7 is a view depicting a further example of image display.

Further, by representing a state of communication together with a state of telecommunication as depicted in the image 150 of the example of FIG. 7 (by representing the state like the person 201 walking on the road 159, for example), it can also be recognized more easily (without the necessity for such a cumbersome work as to switch images) in what situation (state of telecommunication) the communication is being performed. For example, from the state of telecommunication, it can be recognized more easily whether or not the communication is being performed smoothly.

Naturally, any method may be adopted for representing a state of communication, and a moving body other than the person 201 described hereinabove (for example, a bird as in the example of FIG. 5 or the like) may be used for the representation. Also, a representation method by any other than a moving body is possible. For example, a state of communication may be represented by a color, a brightness, a density, or the like of a road or a symbol.

Further, also the method of representing a state of telecommunication to be represented together with a state of communication is desirably set and may be other than the road described above. For example, a moving body or a symbol may be used to represent a state of telecommunication.

<Display of Image Indicative of State of User>

Further, in such a terminal apparatus 100 as described above, the display unit 121 may display an image indicative of a state of the user of each terminal apparatus 100 (for example, the user 131, 153, or 156).

Here, the state of the user may include, for example, a sound volume, a level of comprehension of contents of communication, an information sending request, and a session ending request for requesting to end a session that is in a state in which telecommunication for communicating between telecommunication apparatuses can be performed. For example, in regard to each user, an image indicating at least one of a sound volume, a level of comprehension of contents of communication, an information sending request, and a session ending request may be displayed on the display unit 121.

Further, the state of the user may be represented using an avatar (a virtual character image that is an avatar of the user). For example, in regard to each user, an image including an avatar indicating at least one of a sound volume, a level of comprehension of contents of communication, an information sending request, and a session ending request may be displayed on the display unit 121.

Figure 8:
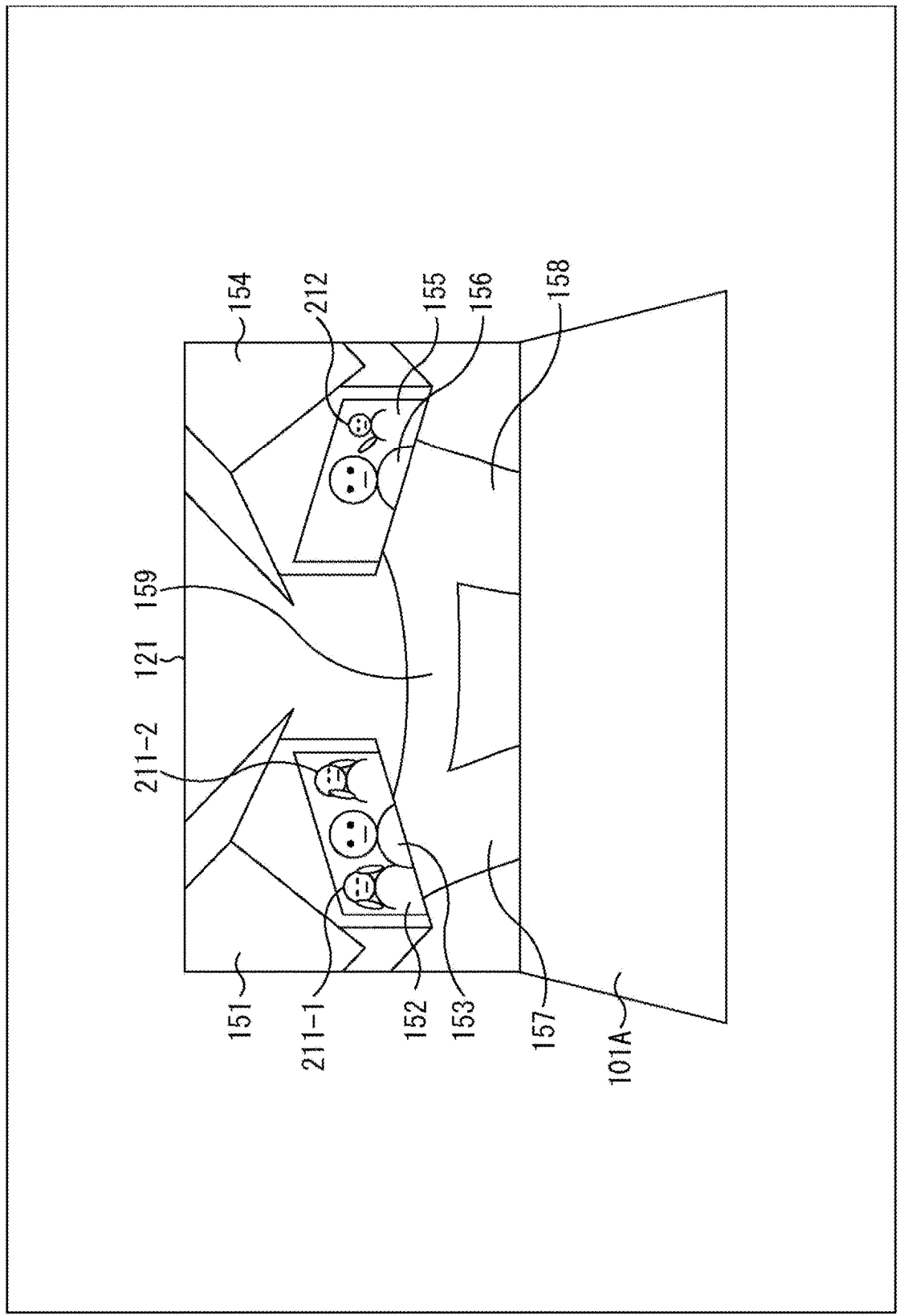
FIG. 8 is a view depicting a further example of image display.

For example, in the image 150 of FIG. 8, an avatar 211-1 of the user 153 is displayed in the telecommunication destination image 152. The avatar 211-1 faces the front (toward the user 131) and covers its ears with its hands. The gesture of covering the ears with the hands indicates that the sound volume is excessively great. Further, the orientation of the avatar indicates the partner of telecommunication corresponding to the state. In short, the avatar 211-1 indicates that the sound volume of sound transmitted from this terminal apparatus 100 is excessively great. Since such information is presented to the user 131 of this terminal apparatus 100 who is a party of the telecommunication, the user 131 can immediately perform such a countermeasure as to make its voice quieter.

Further, in the telecommunication destination image 152, also an avatar 211-2 of the user 153 is depicted. The avatar 211-2 faces the right side in the image (toward the user 156) and covers the ears with the hands. In short, the avatar 211-2 indicates that the sound volume of sound transmitted from the terminal apparatus 100 of the user 156 is excessively great. Since such information is presented to the user 131 of this terminal apparatus 100 who is not a party of the telecommunication (is a third party), the user 131 can immediately perform such a countermeasure as to request the user 156 to make its voice quieter.

It is to be noted that, in the case of the example of FIG. 8, since both the avatar 211-1 and the avatar 211-2 cover the ears with the hands, it can be estimated that, on the terminal apparatus 100 of the user 153, the sound volume of all sound is excessively great. Since the states of users not only in communication with the user 131 but also in communication between telecommunication partners are presented to the user 131, the user 131 can estimate a cause of the state of the user more easily and can take a more appropriate countermeasure. For example, in the case of FIG. 8, the user 131 can propose the user 153 to lower the sound volume setting.

It is to be noted that, in the case where there is no necessity to distinguish the avatar 211-1 and the avatar 211-2 from each other, each of them is referred to as an avatar 211.

On the other hand, in the case where the sound volume is excessively small, the avatar represents this, for example, by such a gesture as to put its hands behind its ears to listen carefully. Also, in this case, the orientation indicates the partner of the communication.

A magnitude of the sound volume or a partner of communication may be represented by a gesture or an orientation of an avatar in such a manner as described above. Naturally, the gesture for representing the magnitude of the sound volume is desirably set and is not restricted to the examples described above. Further, the magnitude of the sound volume may be represented by a facial expression or the like of the avatar. Such representation that uses an avatar as described above makes it possible to recognize the magnitude of the sound volume more easily (more intuitively).

Also, the other information such as the level of comprehension of contents of communication, an information sending request, and a session ending request are basically similar to the case of the sound volume. Such information may be represented by an orientation, a facial expression, a gesture, or the like of the avatar.

The gesture, facial expression, and so forth for representing the level of comprehension of contents of communication by the user are desirably set. For example, in the case where the level of comprehension of contents of communication by the user is low, the avatar of the user may tilt the head, make a thinking gesture, or frown, or a "?" mark may be displayed. On the other hand, in the case where the level of comprehension of contents of communication by the user is high, the avatar of the user may open its eyes wide, clap its hands, or be glad, or an "!" mark may be displayed. Also, in this case, the partner of the communication may be represented by the orientation of the avatar.

Since such information as described above is presented to the user 131 of the terminal apparatus 100, in the case where the user 131 is a party of the communication, the user 131 can immediately perform such a countermeasure as to re-explain or omit explanation. On the other hand, in the case where the user 131 is not a party of the communication (is a third party), the user 131 can immediately perform such a countermeasure as to request a party of the communication for addition or omission of explanation or provide such information as to assist contents of the communication.

The gesture, facial expression, or the like for representing an information sending request is desirably set. For example, in the case where the user has an information sending request (for example, in the case where the user wants to speak), the avatar of the user may raise a hand, open the mouth, become larger, or shine. For example, in the image 150 of the example of FIG. 8, an avatar 212 of the user 156 is displayed in the telecommunication destination image 155. This avatar 212 faces the front (toward the user 131) and raises a hand. The gesture of raising a hand indicates that the user has an information sending request (for example, the user wants to speak).

Further, a requesting destination may be indicated by an orientation of the avatar 212. In the case of the example of FIG. 8, the avatar 212 is making a request, to the user 131, for information sending by the user 156. In the case where a request for information sending is to be issued to the user 153, it is sufficient if the avatar 212 faces the left side in the image (toward the user 153).

Since such information is presented to the user 131 of this terminal apparatus 100, in the case where the user 131 is a party of the communication, the user 131 can immediately take a countermeasure for encouraging the user 156 to send information such as, for example, to cause the user 131 itself to refrain from speaking or to encourage the user 156 to speak. On the other hand, in the case where the user 131 is not a party of the communication (is a third party), the user 131 can immediately take a countermeasure for encouraging the user 156 to send information such as, for example, to cause a party to refrain from speaking or to encourage the user 156 to speak.

The gesture, facial expression, or the like for representing a session ending request is desirably set. For example, in the case where the user has a session ending request (for example, the user wants to end conversation or wants to go home), the avatar of the user may face down, look behind, look at a wristwatch, or get ready to go home such as to put on a jacket. Further, a requesting destination may be indicated by an orientation of the avatar 212.

Since such information is presented to the user 131 of this terminal apparatus 100, the user 131 can immediately perform such a countermeasure as to make a statement to encourage the end of the conversation or greet.

By using an avatar for representation in such a manner as described above, a state of a user can be recognized more easily (more intuitively). For example, if a state of a user is represented only by representation of the user itself, then since there are individual differences in degree or manner of representation of users, there is the possibility that only viewing a captured image of a user may lead to difficulty in identification of a state or an orientation of the user. Further, in the case of a method in which a user is caused to perform a predetermined gesture to represent a state of the user, a complicated work of the user such as to memorize the gesture is required. Further, there is also the possibility that the user may make a wrong gesture or may perform a gesture difficult to identify. By using an avatar for representation, it is possible to suppress such failures as described above and perform appropriate representation. Further, by using an indirect representation using an avatar, it is also possible to suppress an influence on emotions of the partner of communication.

It is to be noted that any method may be adopted for deciding a state of a user. For example, the magnitude of the sound volume may be decided on the basis of the sound volume of sound outputted from the terminal apparatus 100. Further, a captured image of the user may be analysed, so that the state of the user is estimated from the facial expression, gesture, or the like of the user. Furthermore, some other sensor such as, for example, a temperature sensor or an eye tracker may be used to detect a state of a user (perform biological sensing), so that the state of the user is estimated on the basis of the detected information. Further, the state of the user may be decided on the basis of a user instruction or the like inputted by the user.

Further, for example, the level of comprehension of contents of communication or an information sending request may be decided from a facial expression, a gesture, or the like of a user obtained by analyzing a captured image of the user. Further, some other sensor such as, for example, a temperature sensor or an eye tracker may be used to detect a state of a user (perform biological sensing), so that the state of the user is estimated on the basis of the detected information. Furthermore, the state of the user may be decided on the basis of a user instruction or the like inputted by the user.

Furthermore, for example, a session ending request may be decided from a facial expression, a gesture, or the like of a user obtained by analyzing a captured image of the user. Further, some other sensor such as, for example, a temperature sensor or an eye tracker may be used to detect a state of a user (perform biological sensing), so that the session ending request is decided on the basis of the detected information. Furthermore, the session ending request may be decided on the basis of a user instruction or the like inputted by the user. Further, the session ending request may be decided on the basis of some other information such as a schedule or the like of the user. For example, when a time set as a returning-home time in a schedule set in advance comes (or approaches), a decision that the user has a session ending request may be made.

It is to be noted that the state of a user who makes a representation in such a manner as described above is desirably set and is not restricted to the examples described above. For example, the state of the user may include a degree of interest of the user in a topic of communication or the like.

Further, the state of the user described above may be represented together with the state of telecommunication, the state of communication, or the like described above. Since this makes it possible to more easily recognize a state of telecommunication or a state of communication together with the state of the user, recognizing of more various situations can be performed more easily. For example, estimation of a cause of a state of a user can be performed more easily and more accurately.

<Communication Disclosure Control>

It is to be noted that such a system that performs telecommunication among multiple points as described above may be configured such that it can control disclosure of telecommunication. For example, telecommunication between some terminal apparatuses among a plurality of terminal apparatuses participating in the system may be made non-disclosable to the other terminal apparatuses. For example, in the case of FIG. 2, telecommunication (transfer of images, sound, and so forth) between the terminal apparatus 100 of the user 153 and the terminal apparatus 100 of the user 156 may be made non-disclosable to this terminal apparatus 100 (to the user 131 that is a third party to the communication). Furthermore, such setting (whether telecommunication should be made disclosable or non-disclosable) may be made controllable (to set telecommunication disclosable or non-disclosable).

This makes it possible to suppress inappropriate information provision and achieve safer communication.

<State Disclosure Control>

Further, disclosure of such various states as described above (for example, a state of telecommunication, a state of communication, a state of a user, or the like) may be made controllable. For example, the state of telecommunication between some terminal apparatuses among a plurality of terminal apparatuses participating in the system may be made non-disclosable to the other terminal apparatuses. Further, for example, the state of communication between some terminal apparatuses among a plurality of terminal apparatuses participating in the system may be made non-disclosable to the other terminal apparatuses. Furthermore, for example, the state of a user may be made non-disclosable to (some or all of) the other terminal apparatuses. Further, such setting (whether or not a state is made disclosable or non-disclosable) may be made controllable (set so as to be disclosable or set so as to be non-disclosable).

This makes it possible to suppress inappropriate information provision and achieve safer communication.

<Smoothing of Communication>

By presenting such various states as described above such that the overall various states related to telecommunication among multiple points can be recognized, it is possible to perform communication among multiple points more smoothly.

2. First Embodiment

<Communication System>

Figure 9:
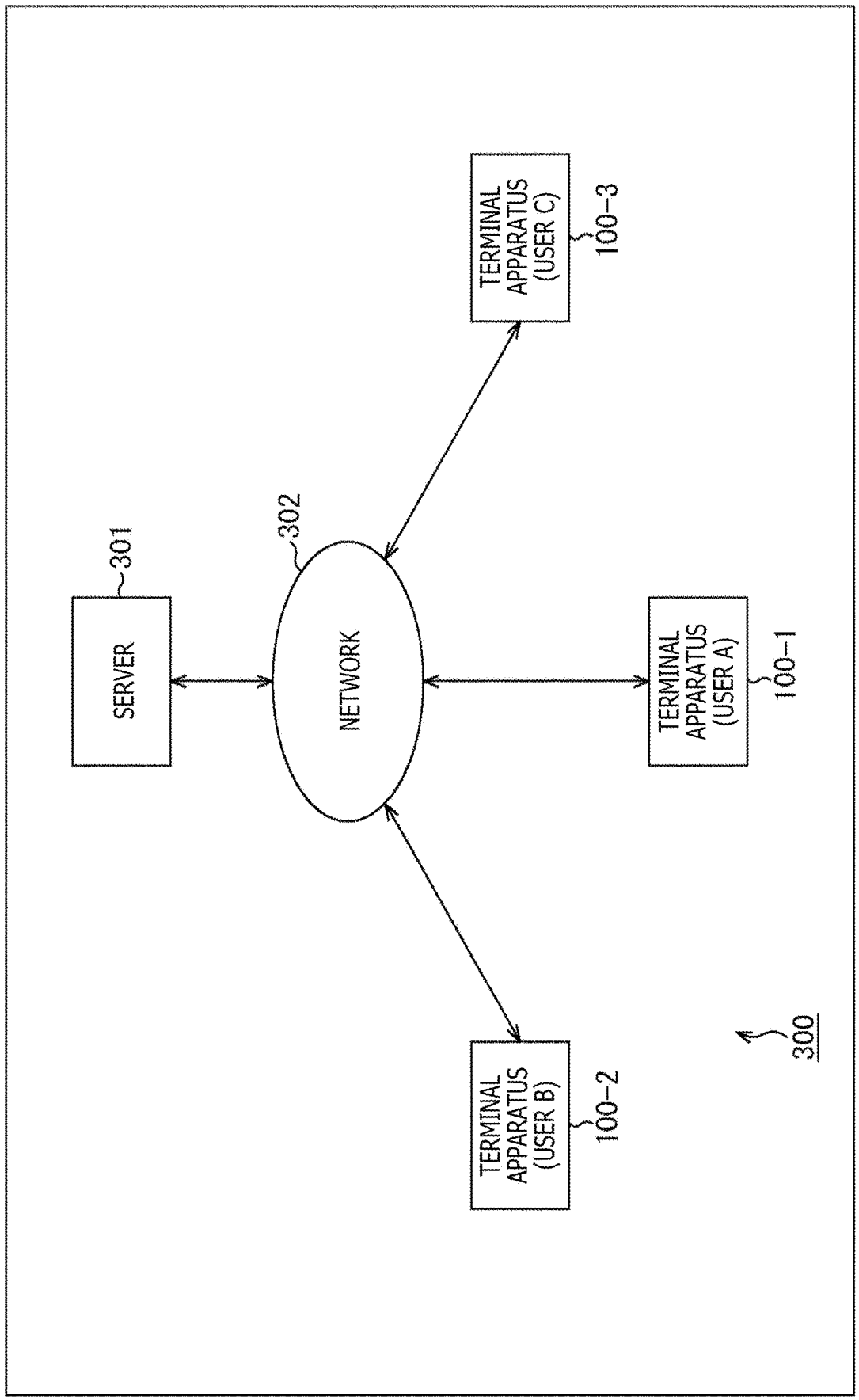
FIG. 9 is a view depicting an example of a main configuration of a communication system.

Now, a configuration of a system that implements such communication as described above is described. FIG. 9 is a view depicting an example of a main configuration of a communication system that is a mode of a telecommunication system to which the present technology is applied. A communication system 300 depicted in FIG. 9 is a system that implements communication among multiple points.

As depicted in FIG. 9, the communication system 300 includes a server 301 and terminal apparatuses 100-1 to 100-3. The server 301 and the terminal apparatuses 100-1 to 100-3 are connected for telecommunication with each other through a network 302.

Each of the terminal apparatuses 100-1 to 100-3 is one form of the information processing apparatus to which the present technology is applied and have such an appearance as depicted in FIG. 1. It to be noted that, in the case where the terminal apparatuses 100-1 to 100-3 need not be distinguished and described separately from each other, each of them is referred to as the terminal apparatus 100. Each terminal apparatus 100 is operated by a user who performs communication. In the following description, the user of the terminal apparatus 100-1 is referred to as user A, the user of the terminal apparatus 100-2 is referred to as user B, and the user of the terminal apparatus 100-3 is referred to as user C.

Each terminal apparatus 100 is connected to the network 302 by wired telecommunication, by wireless telecommunication, or by both of them. It is to be noted that, although three terminal apparatuses 100 are depicted in FIG. 9, it is sufficient if the number of terminal apparatuses 100 included in the communication system 300 is three or more, and the number may be four or more.

The server 301 is a form of the information processing apparatus to which the present technology is applied and provides a service for implementing telecommunication among multiple points to the terminal apparatuses 100. The server 301 is connected to the network 302 by wired telecommunication, by wireless telecommunication, or by both of them. It is to be noted that, although one server 301 is depicted in FIG. 9, the number of such servers 301 included in the communication system 300 is desirably set and may be two or more.

For example, the server 301 establishes a session with each terminal apparatus 100 and manages the connection.

Further, the server 301 controls telecommunication between the terminal apparatuses 100. For example, each terminal apparatus 100 transmits telecommunication data of an image, sound, and so forth toward the server 301. The server 301 transmits the telecommunication data to an appropriate transmission destination (terminal apparatus 100).

Further, the server 301 manages various states such as the state of telecommunication, the state of communication, and the states of the users. For example, the server 301 generates information regarding various states on the basis of information supplied from each terminal apparatus 100 and transmits the information to an appropriate terminal apparatus 100 as occasion demands.

The network 302 is any telecommunication network, and may be a telecommunication network for wired telecommunication, may be a telecommunication network for wireless telecommunication, or may include both of them. Further, the network 302 may include a single telecommunication network or may include a plurality of telecommunication networks. For example, the network 302 may include a telecommunication network or networks or a telecommunication path or paths of any telecommunication standard or standards such as the Internet, a public telephone network, a wide area telecommunication network for wireless mobiles such as a so-called 3G line or 4G line, a WAN (Wide Area Network), a LAN (Local Area Network), a wireless telecommunication network that performs telecommunication in compliance with the Bluetooth (registered trademark) standard, a telecommunication line for near field wireless telecommunication such as NFC (Near Field Communication), a telecommunication line for infrared telecommunication, and a telecommunication network for wired telecommunication in compliance with such a standard as HDMI (High-Definition Multimedia Interface) (registered trademark) or USB (Universal Serial Bus) (registered trademark).

<Server>

Figure 10:
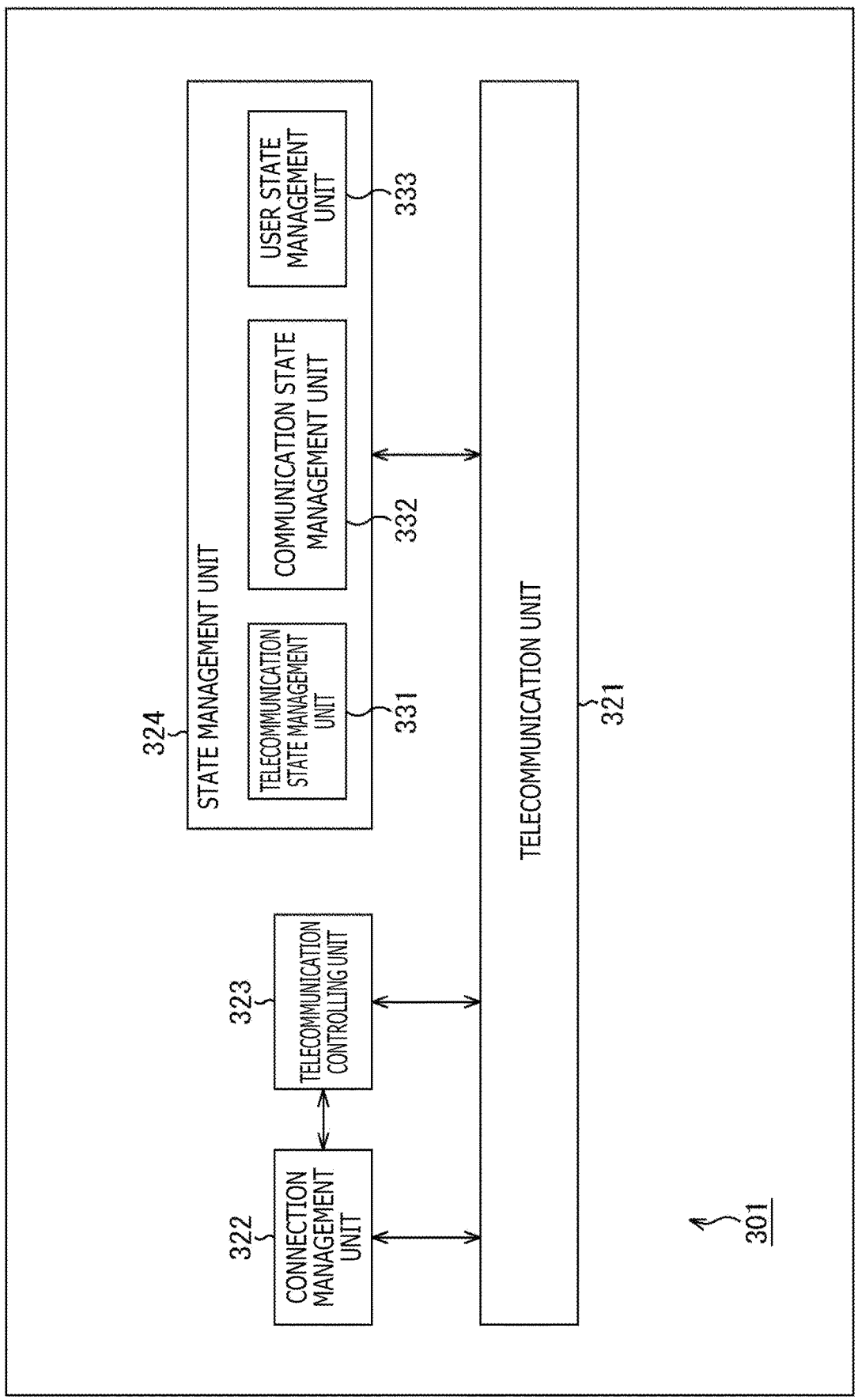
FIG. 10 is a block diagram depicting an example of a main configuration of a serves.

FIG. 10 is a block diagram depicting an example of a main configuration of the server 301. As depicted in FIG. 10, the server 301 includes a telecommunication unit 321, a connection management unit 322, a telecommunication controlling unit 323, and a state management unit 324.

The telecommunication unit 321 is a telecommunication interface and is connected to the network 302 such that it performs processing related to telecommunication with another apparatus (for example, a terminal apparatus 100) through the network 302. For example, the telecommunication unit 321 receives telecommunication data transmitted from a terminal apparatus 100 through the network 302 and supplies information included in the telecommunication data to the connection management unit 322, the telecommunication controlling unit 323, the state management unit 324, and so forth. Further, the telecommunication unit 321 transmits telecommunication data supplied from the connection management unit 322, the telecommunication controlling unit 323, the state management unit 324, or the like to a terminal apparatus 100 of a transmission destination of the telecommunication data through the network 302.

The connection management unit 322 performs processing related to management of the state of a session with each terminal apparatus 100. For example, the connection management unit 322 establishes or disconnects a session in response to a request from a terminal apparatus 100. Further, the connection management unit 322 stores and manages the states of sessions with the individual terminal apparatuses 100 (in other words, states of sessions between the terminal apparatuses 100 described hereinabove in <1. Presentation of State in Communication System>). Further, the connection management unit 322 can provide the information to the telecommunication controlling unit 323 if necessary.

The telecommunication controlling unit 323 performs processing related to control of telecommunication between multiple points, namely, telecommunication between the terminal apparatuses 100. For example, the telecommunication controlling unit 323 acquires telecommunication data transmitted from a terminal apparatus 100 through the telecommunication unit 321. Further, the telecommunication controlling unit 323 specifies a transmission destination of the telecommunication data. Furthermore, the telecommunication controlling unit 323 supplies the telecommunication data to the telecommunication unit 321 so as to be transmitted to the specified transmission destination.

Further, the telecommunication controlling unit 323 controls, on the basis of control information for controlling disclosure/nondisclosure of information related to telecommunication transmitted from a terminal apparatus 100, disclosure/nondisclosure of contents of the telecommunication. In particular, in response to a request from a terminal apparatus 100, the telecommunication controlling unit 323 discloses or avoids disclosure of contents of telecommunication to any other terminal apparatus 100 that is a third party as described hereinabove in <1. Presentation of State in Communication System>.

The state management unit 324 performs processing related to management of various states such as, for example, the state of telecommunication, the state of communication, and the states of the users described hereinabove in <1. Presentation of State in Communication System>. Further, the state management unit 324 places information related to telecommunication between the terminal apparatuses 100 into telecommunication data to be transmitted toward a desired terminal apparatus 100. In short, the state management unit 324 provides information related to telecommunication between the terminal apparatuses 100 suitably to the terminal apparatus 100.

The state management unit 324 includes a telecommunication state management unit 331, a communication state management unit 332, and a user state management unit 333.

The telecommunication state management unit 331 performs processing related to management of the state of telecommunication described in <1. Presentation of State in Communication. System>. For example, the telecommunication state management unit 331 manages the state of telecommunication between the terminal apparatuses 100 on the basis of transmission and reception situations and so forth of telecommunication data transmitted from a terminal apparatus 100.

For example, the telecommunication state management unit 331 may manage, as the state of telecommunication, the telecommunication stability degree described in <1. Presentation of State in Communication System>. Further, the telecommunication state management unit 331 may manage, as the state of telecommunication, the non-telecommunicable state described in <1. Presentation of State in Communication System>. Furthermore, the telecommunication state management unit 331 may manage, as the state of telecommunication, the delay amount of telecommunication described in <1. Presentation of State in Communication System>. Further, the telecommunication state management unit 331 may manage, as the state of telecommunication, the state of a session between the terminal apparatuses 100 described in <1. Presentation of State in Communication System>. In this case, the telecommunication state management unit 331 manages the state of a session between the terminal apparatuses 100 using information related to the state of a session with each terminal apparatus 100 managed by the connection management unit 322.

Further, the telecommunication state management unit 331 places, as information regarding telecommunication between the terminal apparatuses 100, information regarding a state of the telecommunication into telecommunication data to be transmitted toward a desired terminal apparatus 100. In short, the telecommunication state management unit 331 provides information regarding a state of telecommunication between the terminal apparatuses 100 suitably to a terminal apparatus 100.

For example, the telecommunication state management unit 331 may place, as information regarding the state of telecommunication, information regarding the stability degree of telecommunication described in <1. Presentation of State in Communication System> into the telecommunication data. Further, the telecommunication state management unit 331 may place, as information regarding the state of telecommunication, information indicative of a non-telecommunicable state described in <1. Presentation of State in Communication System> into the telecommunication data. Furthermore, the telecommunication state management unit 331 may place, as information regarding the state of telecommunication, information regarding the delay amount of telecommunication described in <1. Presentation of State in Communication System> into the telecommunication data.

The communication state management unit 332 performs processing related to management of the state of communication described in <1. Presentation of State in Communication System>. For example, the communication state management unit 332 manages the state of communication between the terminal apparatuses 100 on the basis of contents of telecommunication data transmitted from the terminal apparatuses 100.

For example, the communication state management unit 332 may manage, as the state of communication, the terminal apparatuses 100 of users who are to communicate described <1. Presentation of State in Communication System>.

Further, the communication state management unit 332 places, as the information regarding telecommunication between the terminal apparatuses 100, information regarding the state of communication into the telecommunication data to be transmitted toward a desired terminal apparatus 100. In short, the communication state management unit 332 provides information regarding a state of communication between the terminal apparatuses 100 suitably to a terminal apparatus 100.

For example, the communication state management unit 332 may place, as the information regarding the state of communication, information indicative of a terminal apparatus 100 of a user who is to communicate described in <1. Presentation of State in Communication System> into the telecommunication data.

The user state management unit 333 performs processing related to management of the states of the users described in <1. Presentation of State in Communication System>. For example, the user state management unit 333 manages the states of the users of the terminal apparatuses 100 on the basis of contents of telecommunication data transmitted from the terminal apparatuses 100.

Further, the user state management unit 333 places, as the information related to the telecommunication between the terminal apparatuses 100, information regarding the states of the users into the telecommunication data to be transmitted toward a desired terminal apparatus 100. In short, the user state management unit 333 suitably provides information regarding the states of the users of the terminal apparatuses 100 to a terminal apparatus 100.

For example, the user state management unit 333 may place, as the information regarding the states of the users, information regarding the sound volume described in <1. Presentation of State in Communication System> into the telecommunication data. Further, the uses state management unit 333 may place, as the information regarding the states of the users, information indicative of the level of comprehension of contents of communication described in <1. Presentation of State in Communication System> into the telecommunication data. Furthermore, the user state management unit 333 may place, as the information regarding the states of the users, information indicative of an information sending request described in <1. Presentation of State in Communication System> into the telecommunication data. Further, the user state management unit 333 may place, as the information regarding the states of the users, information indicative of a session ending request described in <1. Presentation of State in Communication System> into the telecommunication data.

It is to be noted that, although it is described that, in FIG. 10, the state management unit 324 includes the blocks of the telecommunication state management unit 331 to the user state management unit 333, it is sufficient if the state management unit 324 includes at least one of the blocks of the telecommunication state management unit 331 to the user state management unit 333. In other words, it is sufficient if the state management unit 324 can manage one or more of the state of telecommunication, the state of communication, and the states of the users described in <1. Presentation of State in Communication System> and place information regarding the states into the telecommunication data. Further, the state management unit 324 may include a state management unit other than the blocks of the telecommunication state management unit 331 to the user state management unit 333. In other words, the state management unit 324 may also manage any state other than the various states described in <1. Presentation of State in Communication System> and place the state into the telecommunication data.

Further, the state management unit 324 controls, on the basis of control information for controlling disclosure/non-disclosure of information regarding telecommunication transmitted from a terminal apparatus 100, disclosure/non-disclosure of a state of the telecommunication. In particular, the state management unit 324 discloses or avoids disclosure, in response to a request from a terminal apparatus 100, states regarding the telecommunication (for example, the state of telecommunication, the state of communication, the states of the users, and so forth) to another terminal apparatus 100 of a third party as described in <1. Presentation of State in Communication System>.

It is to be noted that the processing units (blocks from the telecommunication unit 321 to the state management unit 324 (blocks from the telecommunication state management unit 331 to the user state management unit 333)) have any configuration. For example, each processing unit may include a logic circuit that implements the processes described hereinabove. Further, each processing unit may include, for example, a CPU (Central Processing Unit), a ROM (Read Only Memory), a RAM (Random Access Memory), and so forth and execute a program using them to implement the processes described hereinabove. Naturally, each processing unit may have both configurations, so that part of the processes described hereinabove are implemented by the logic circuit and the other part are implemented by execution of a program. The configurations of the processing units may be independent of each other such that, for example, some of the processing units implement part of the processes described hereinabove by the logic circuit, some other part of the processing units executes a program to implement the processes described above, and besides the other processing units implement the processes described above by both the logic circuit and the execution of a program.

<Terminal Apparatus>

Figure 11:
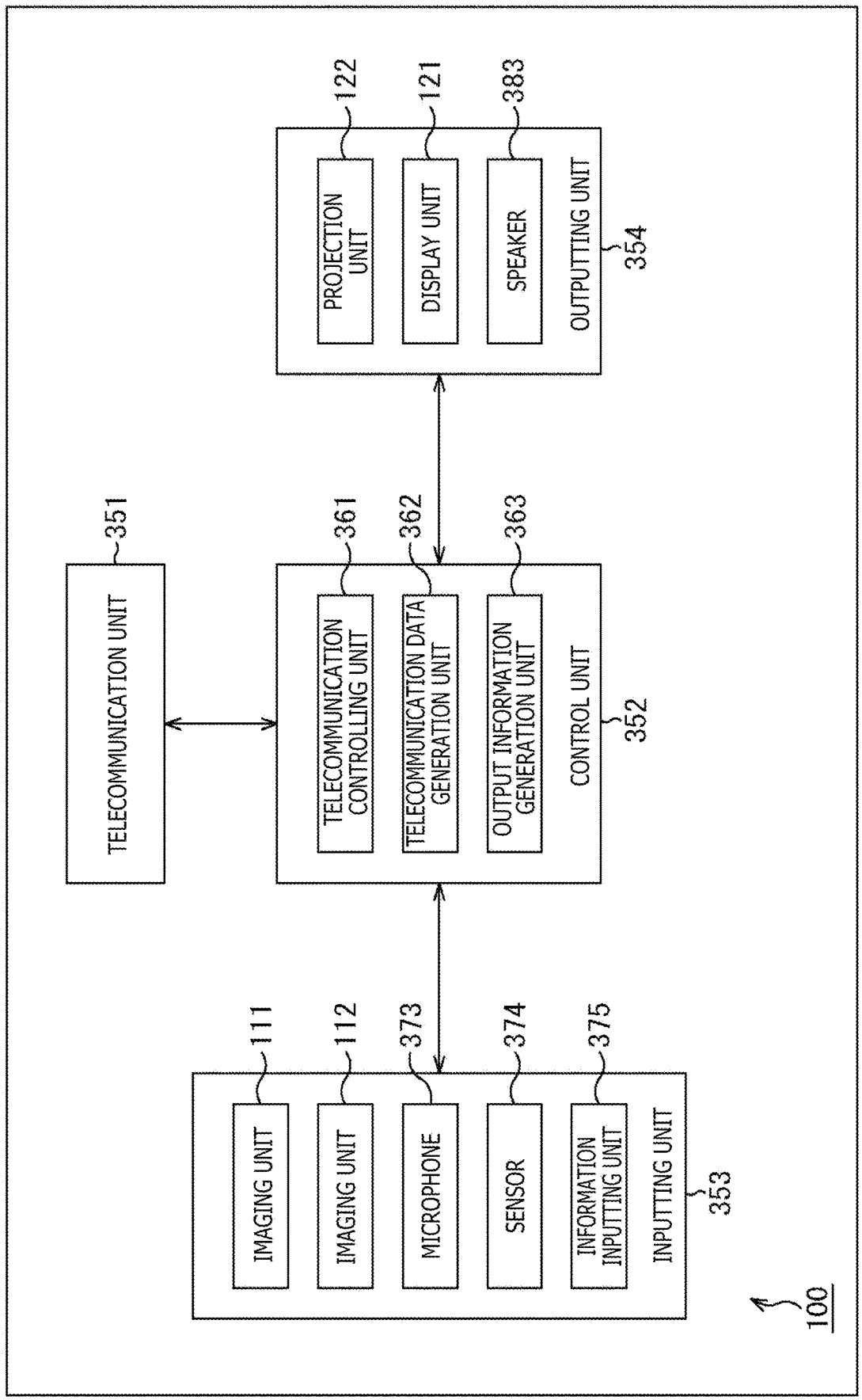
FIG. 11 is a block diagram depicting an example of a main configuration of the terminal apparatus.

FIG. 11 is a block diagram depicting an example of a main configuration of the terminal apparatus 100. As depicted in FIG. 11, the terminal apparatus 100 includes a telecommunication unit 351, a control unit 352, an inputting unit 353, and as outputting unit 354.

The telecommunication unit 351 is a telecommunication interface, is connected to the network 302, and performs processing related to telecommunication with another apparatus (for example, the server 301) through the network 302 under the control of a telecommunication controlling unit 361 hereinafter described. For example, the telecommunication unit 351 receives telecommunication data transmitted from the server 301 through the network 302 and supplies the received telecommunication data to the control unit 352 (the telecommunication controlling unit 361 hereinafter described). Further, the telecommunication unit 351 acquires telecommunication data supplied from the control unit 352 or the like and transmits the acquired telecommunication data toward the server 301 through the network 302.

The telecommunication data transmitted from the server 301 may include, for example, such information regarding telecommunication between the terminal apparatuses 100 as described hereinabove and like information. In short, in this case, the telecommunication unit 351 receives information regarding telecommunication between the terminal apparatuses 100.

Further, the telecommunication data to be transmitted and received may further include data to be transferred between the terminal apparatuses 100 such as data of captured images, sound, and so forth of a user of a terminal apparatus 100. In short, in this case, the telecommunication unit 351 performs telecommunication for performing communication.

Furthermore, the telecommunication data to be transmitted may include, for example, information regarding a state of a user detected by the inputting unit 353 (various sensors hereinafter described). In short, in this case, the telecommunication unit 351 transmits information regarding the state of the user to the server 301.

The control unit 352 performs processing related to control of various processes for telecommunication and so forth. Further, the control unit 352 includes a telecommunication controlling unit 361, a telecommunication data generation unit 362, and an output information generation unit 363.

The telecommunication controlling unit 361 performs processing related to control of telecommunication. For example, the telecommunication controlling unit 361 acquires telecommunication data generated by the telecommunication data generation unit 362. Further, the telecommunication controlling unit 361 supplies the telecommunication data to the telecommunication unit 351 so as to be transmitted from the telecommunication unit 351. Furthermore, the telecommunication controlling unit 361 controls the telecommunication unit 351 to receive telecommunication data transmitted from the server 301 and acquires the received telecommunication data. Further, the telecommunication controlling unit 361 supplies the telecommunication data to the output information generation unit 363.

The telecommunication data generation unit 362 performs processing related to generation of telecommunication data. For example, the telecommunication data generation unit 362 generates telecommunication data of a format in compliance with a predetermined telecommunication standard, the telecommunication data including information supplied from the inputting unit 353 and so forth. Further, the telecommunication data generation unit 362 supplies the generated telecommunication data to the telecommunication controlling unit 361.

For example, the telecommunication data generation unit 362 generates telecommunication data including captured image data generated by the imaging unit 111 and sound data generated by a microphone 373 hereinafter described. Further, the telecommunication data generation unit 362 generates telecommunication data including detection data generated by a sensor 374 hereinafter described. Furthermore, the telecommunication data generation unit 362 generates telecommunication data including data inputted from an information inputting unit 375 hereinafter described. Further, the telecommunication data generation unit 362 analyzes captured image data generated by the imaging unit 112, detects an operation by the user 131, performs processing corresponding to the user operation, and generates telecommunication data including commands, data, and so forth corresponding to the user operation.

Further, the telecommunication data generation unit 362 generates control information for controlling whether or not information regarding telecommunication with another terminal apparatus 100 is to be disclosed on the basis of a user instruction or the like accepted by the inputting unit 353. This control information includes information for controlling, for example, whether or not contents of telecommunication are to be disclosed. Further, this control information includes information for controlling, for example, whether or not a state related to telecommunication (for example, a state of telecommunication, a state of communication, a state of a user, or the like) is to be disclosed. The telecommunication data generation unit 362 supplies such control information to the server 301 through the telecommunication controlling unit 361 and so forth to control whether or not information regarding telecommunication with another terminal apparatus 100 (for example, contents of telecommunication, a state related to telecommunication, and so forth) is to be disclosed (disclosure/nondisclosure of information regarding telecommunication) as described in <1. Presentation of State in Communication System.

The output information generation unit 363 performs processing related to generation of output information. For example, the output information generation unit 363 acquires telecommunication data transmitted from the server 301 and supplied from the telecommunication controlling unit 361. Further, the output information generation unit 363 generates output information such as image data for display, sound data for outputting, and image data for projection on the basis of (information included in) the telecommunication data.

For example, the output information generation unit 363 generates such an image for display as the image 150 described in <1. Presentation of State in Communication System> on the basis of information regarding telecommunication between the terminal apparatuses 100 included in the telecommunication data. In short, the output information generation unit 363 generates an image for display that indicates at least one of the state of telecommunication, the state of communication, or the states of the users described in <1. Presentation of State in Communication System>.

For example, the output information generation unit 363 generates an image for display that indicates a state of telecommunication between this terminal apparatus 100 and another terminal apparatus 100 and a state of telecommunication between a plurality of other terminal apparatuses 100. For example, the output information Generation unit 363 may generate an image indicative of states of sessions described in <1. Presentation of State in Communication System> as the state of the telecommunication.

For example, the output information generation unit 363 may generate an image for display that indicates a state in which a session is established between this terminal apparatus 100 and another terminal apparatus 100 as a road that connects the lower end of the image and a picture pattern (for example, a house or the like) indicative of the other terminal apparatus 100 and indicates a state in which a session is established between a plurality of other terminal apparatuses 100 as a road that interconnects picture patterns (for example, houses or the like) indicative of the other terminal apparatuses 100.

Further, the output information generation unit 363 may generate an image for display that indicates a state in which a session is established between this terminal apparatus 100 and another terminal apparatus 100 as a moving body (for example, a bird or the like) that moves between the lower end of the image and a picture pattern (for example, a house or the like) indicative of the other terminal apparatus 100 and indicates a state in which a session is established between a plurality of other terminal apparatuses 100 as a moving body (for example, a bird or the like) that moves between picture patterns (for example, houses or the like) indicative of the other terminal apparatuses 100.

Furthermore, the output information generation unit 363 may generate an image for display that indicates a state in which a session is established between this terminal apparatus 100 and another terminal apparatus 100 and a state in which a session is established between a plurality of other terminal apparatuses 100 using symbols for identifying each of the terminal apparatuses 100.

Further, for example, the output information generation unit 363 may generate, as the state of telecommunication, an image for display that indicates a non-telecommunicable state described in <1. Presentation of State in Communication System>. For example, the output information generation unit 363 may generate an image for display that indicates this non-telecommunicable state as a thickness of a road, a manner of movement of a moving body, or a display state of a symbol.

Further, for example, the output information generation unit 363 may generate, as the state of telecommunication, an image for display that indicates a degree of stability of telecommunication described in <1. Presentation of State in Communication System>. For example, the output information generation unit 363 may generate an image for display that indicates the degree of stability of telecommunication as an obstacle provided on a road, a manner of movement of a moving body, or a display state of a symbol.

Further, for example, the output information generation unit 363 may generate, as the state of telecommunication, an image for display that indicates a delay amount of telecommunication described in <1. Presentation of State in Communication System>. For example, the output information generation unit 363 may Generate an image for display that indicates the delay amount of telecommunication as a length of a road, a manner of movement of a moving body, or a display state of a symbol.

Further, for example, the output information generation unit 363 may generate an image for display that indicates a terminal apparatus 100 that is to perform communication described is <1. Presentation of State in Communication System> as the state of communication described hereinabove. For example, the output information generation unit 363 may generate an image for display that indicates this communication as a moving body and indicates a terminal apparatus 100 that is to perform communication by a movement source and a movement destination of the moving body.

Furthermore, for example, the output information generation unit 363 may generate, as the state of the user described above, an image for display indicative of a sound volume described in <1. Presentation of State in Communication System>. Further, the output information generation unit 363 may generate, as the state of the user described above, an image for display indicative of a level of comprehension of contents of communication described in <1. Presentation of State in Communication System>. Further, the output information generation unit 363 may generate, as the state of the user described above, an image for display indicative of an information sending request described in <1. Presentation of State in Communication System>. Further, the output information generation unit 363 may generate, as the state of the user described above, an image for display indicative of a session ending request described in <1. Presentation of State in Communication System>. For example, the output information generation unit 363 may generate an image for display including an avatar indicative of a state of a user.

It is to be noted that the image for display generated by the output information generation unit 363 may include an image indicative of information other than the state of telecommunication, the state of communication, and the states of the users described in <1. Presentation of State in Communication System>. For example, as described in <1. Presentation of State in Communication System>, this image for display may include a captured image of a user of a telecommunication partner (telecommunication destination image) and so forth. Further, an image indicative of a state other than the various states described above may be included in this image for display.

The output information generation unit 363 supplies generated output information to the outputting unit 354. For example, the output information generation unit 363 supplies data of an image for display (image data for display) generated in such a manner as described above to (the display unit 121 of) the outputting unit 354.

The inputting unit 353 performs processing related to inputting of information. For example, the inputting unit 353 accepts information regarding an outside of a terminal apparatus 100 (for example, the user), an instruction inputted by the user, and so forth. For example, the inputting unit 353 accepts an instruction regarding whether or not information regarding telecommunication with another terminal apparatus 100 is to be disclosed. For example, the inputting unit 353 accepts an instruction regarding whether or not contents of the telecommunication are to be disclosed. Further, the inputting unit 353 accepts an instruction regarding whether or not a state related to the telecommunication (for example, a state of telecommunication, a state of communication, a state of the user, or the like) is to be disclosed. The inputting unit 353 supplies the accepted instruction and information to the control unit 352 (for example, the telecommunication data generation unit 362).

Further, the inputting unit 353 includes the imaging unit 111 and the imaging unit 112 depicted in FIG. 1. Furthermore, the inputting unit 353 additionally includes the microphone 373, the sensor 374, and the information inputting unit 375.

The imaging unit 111 captures an image of an imaging target and generates data of the captured image (captured image data). The imaging unit 112 captures an image of (the region 101B of) the upper face 101A and generates data of the captured image (captured image data). The microphone 373 collects sound of the user 131 and generates sound data. The sensor 374 includes any sensor or sensors, performs detection of information regarding the state of the user 131, and generates data of the detected information (detection data) (performs biological sensing). The information inputting unit 375 accepts any data inputted from the outside of the terminal apparatus 100 on the basis of an operation by the user or the like.

The outputting unit 354 performs processing related to outputting of information. For example, the outputting unit 354 acquires output information supplied from the control unit 352 (the output information generation unit 363). Further, the outputting unit 354 includes the display unit 121 and the projection unit 122. Furthermore, the outputting unit 354 additionally includes a speaker 383.

The display unit. 121 acquires image data for display supplied from the control unit 352 (the output information generation unit 363) and displays the image for display. For example, the display unit 121 displays the image for display generated in such a manner as described above by the output information generation unit 363.

The projection unit 122 acquires image data for projection supplied from the control unit 352 (the output information generation unit 363) and projects the image for projection to (the region 101B of) the upper face 101A. The speaker 383 acquires sound data for outputting supplied from the control unit 352 (the output information generation unit 363) and outputs the sound for outputting.

It is to be noted that the processing units (blocks of the telecommunication unit 351 to the outputting unit 354 and the telecommunication controlling unit 361 to the output information generation unit 363) have any configuration. For example, the processing units may include a logic circuit that implements the processes described above. Further, each processing unit may include, for example, a CPU, a ROM, a RAM, and so forth and execute a program using them to implement the processes described hereinabove. Naturally, each processing unit may have both configurations such that part of the processes described hereinabove are implemented by the logic circuit and the other part are implemented by execution of a program. The configurations of the processing units may be independent of each other such that, for example, some of the processing units implement part of the processes described hereinabove by the logic circuit, some other part of the processing units executes a program to implement the processes described above, and besides the other processing units implement the processes described above by both the logic circuit and the execution of a program.

Since the communication system 300, the terminal apparatus 100, and the server 301 have the configurations described above, they can achieve such advantageous effects as described in <1. Presentation of State in Communication System>. Accordingly, communication between multiple points can be performed more smoothly.

<Flow of Telecommunication Process>

Figure 12:
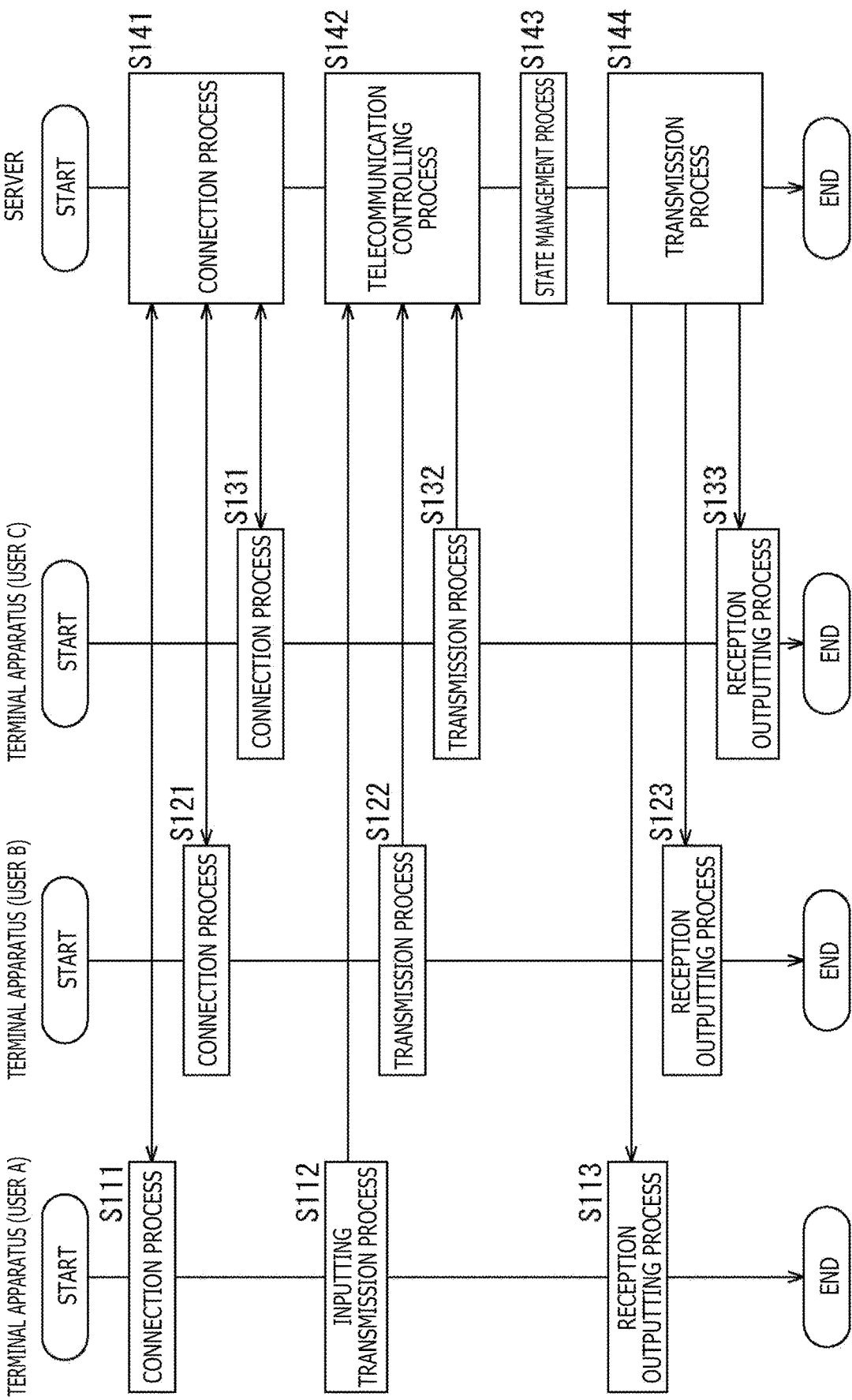
FIG. 12 is a flow chart illustrating an example of a flow of a telecommunication process.

Now, a flow of processing executed by such a communication system 300 as described above is described. An example of a flow of a telecommunication process is described with reference to a flow chart of FIG. 12.

After the telecommunication process is started, the terminal apparatus 100-1 of the user A performs a connection process for establishing a session with the server 301 at step S111. Similarly, the terminal apparatus 100-2 of the user B performs a connection process for establishing a session with the server 301 at step S121. Similarly, the terminal apparatus 100-3 of the user C performs a connection process for establishing a session with the server 301 at step S131. The server 301 performs a connection process for establishing such sessions at step S141 correspondingly to the processes.

In a state in which the sessions are established by such processes as described above, the terminal apparatus 100-1 performs an input transmission process to perform inputting of information (for example, image capturing, sound collection, and so forth) and transmission of the input information to the server 301 at step S112. Similarly, at step S122, the terminal apparatus 100-2 performs an input transmission process to perform inputting of information (for example, image capturing, sound collection, and so forth) and transmission of the input information to the server 301. Similarly, at step S132, the terminal apparatus 100-3 performs an input transmission process to perform inputting of information (for example, image capturing, sound collection, and so forth) and transmission of the input information to the server 301. The server 301 performs a telecommunication controlling process for controlling telecommunication between the terminal apparatuses 100 at step S142 correspondingly to the processes.

Further, at step S143, the server 301 performs a state management process of managing the state in regard to the telecommunication controlled in such a manner as described above.

Furthermore, the server 301 performs a transmission process of transmitting telecommunication data to the terminal apparatuses 100 under the control of the telecommunication controlling process described above. Correspondingly to this process, the terminal apparatus 100-1 performs a reception outputting process to receive the telecommunication data and outputs output information at step S113. Similarly, the terminal apparatus 100-2 performs a reception outputting process to receive the telecommunication data and outputs output information at step S133. Similarly, the terminal apparatus 100-3 performs a reception outputting process to receive the telecommunication data and outputs output information at step S133.

The telecommunication process is performed in such a flow as described above. Thereafter, in a state in which the sessions are established, such various processes as an input transmission process, a reception outputting process, a telecommunication controlling process, a state management process, and a transmission process are performed suitably.

<Flow of Input Transmission Process>

Figure 13:
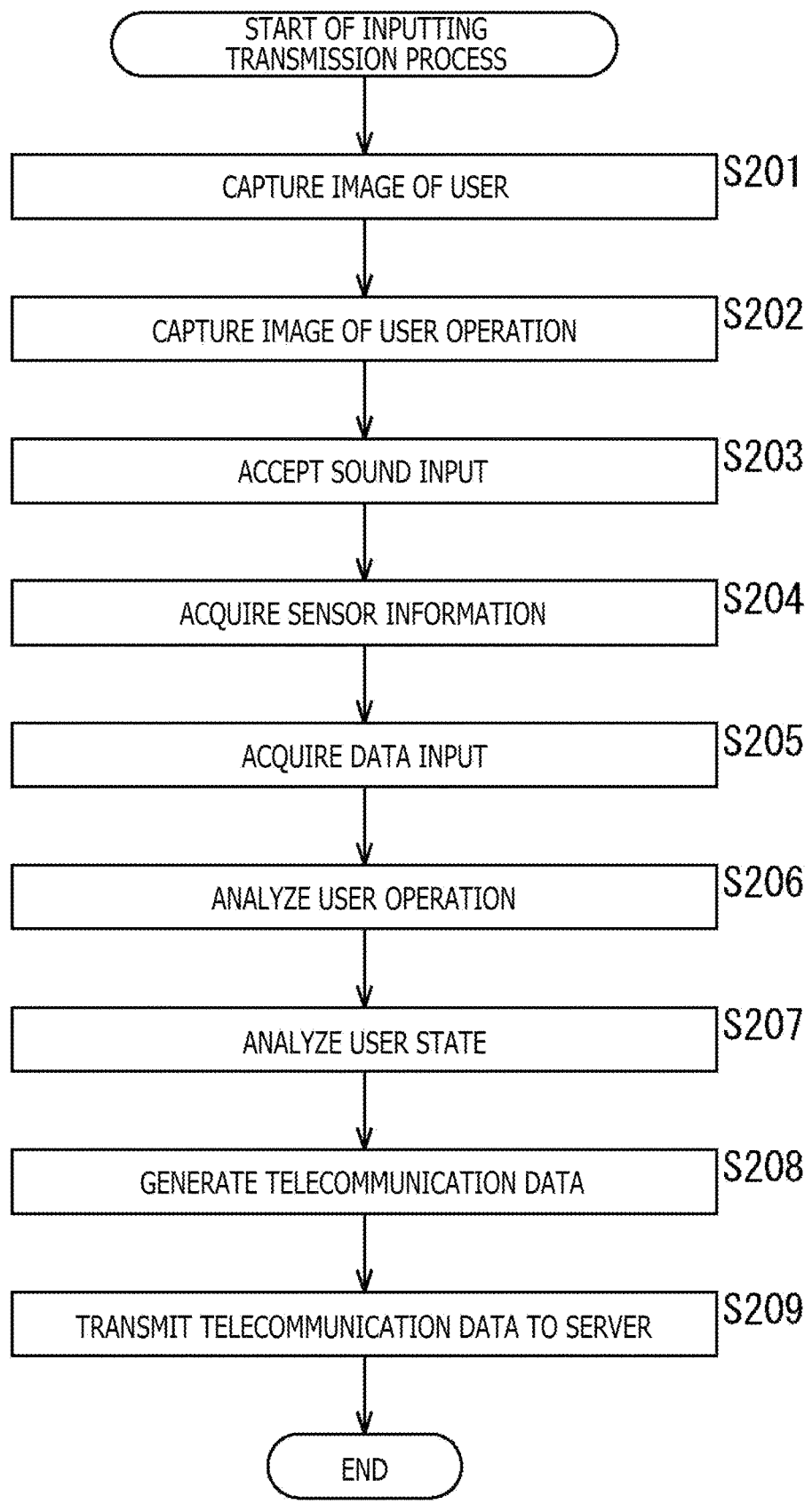
FIG. 13 is a flow chart illustrating an example of a flow of an input transmission process.

Now, an example of a flow of the input transmission process described above (steps S112, S122, and S132) executed by the individual terminal apparatuses 100 is described with reference to a flow chart of FIG. 13.

After the input transmission process is started, the imaging unit 111 of the terminal apparatus 100 images the user 131 to generate a captured image of the user at step S201.

At step S202, the imaging unit 112 images a user operation performed in the region 101B of the upper face 101A to generate a captured image of the user operation.

At step S203, the microphone 373 accepts a sound input of voice or the like of the user to generate sound data.

At step S204, the sensor 374 senses the state of the user to generate sensor information (detection data).

At step S205, the information inputting unit 375 accepts a data input.

At step S206, the telecommunication data generation unit 362 analyzes the captured image obtained at step S202 in regard to the user operation.

At step S207, the telecommunication data generation unit 362 analyzes the detection data obtained at step S204 in regard to the state of the user.

At step S208, the telecommunication data generation unit 362 generates telecommunication data including the captured image data obtained at step S201, the sound data obtained at step S203, the data accepted at step S205, the user operation detected at step S206, the state of the user detected at step S207, and so forth.

At step S209, the telecommunication controlling unit 361 transmits the telecommunication data obtained at step S208 to the server 301 through the telecommunication unit 351.

After the telecommunication data is transmitted, the input transmission process is ended.

<Flow of Telecommunication Controlling Process>

Figure 14:
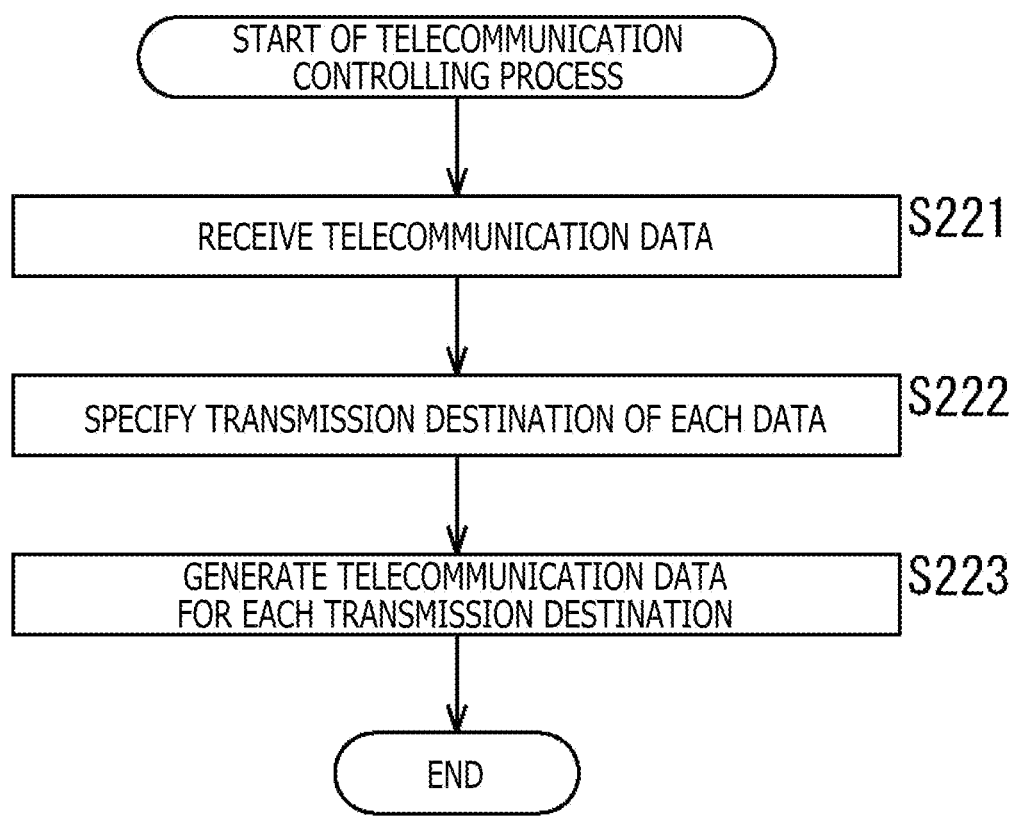
FIG. 14 is a flow chart illustrating an example of a flow of a telecommunication controlling process.

Now, an example of a flow of the telecommunication controlling process (step S142) executed by the server 301 is described with reference to a flow chart of FIG. 14.

After the telecommunication controlling process is started, the telecommunication controlling unit 323 of the server 301 controls the telecommunication unit 321 to receive telecommunication data supplied from each terminal apparatus 100 at step S221.

At step S222, the telecommunication controlling unit 323 specifies a transmission destination of each piece of the received telecommunication data. For example, the telecommunication controlling unit 323 specifies a transmission destination of part or all of the telecommunication data on the basis of the states of the sessions managed by the connection management unit 322, telecommunication disclosure restriction setting, designation information of a transmission destination included in the telecommunication data, and so forth. For example, in the case where there is no restriction to the transmission destination, the telecommunication controlling unit 323 specifies all of the terminal apparatuses 100 with which a session is established as the transmission destination of the telecommunication data. For example, in the case where only part of the telecommunication data is to be transmitted to a terminal apparatus 100 (the transmission destination of the other part is the server 301), the telecommunication controlling unit 323 specifies a transmission destination for the part. Further, in the case where the telecommunication data includes a plurality of pieces of data to which transmission destinations different from each other are designated, the telecommunication controlling unit 323 specifies a transmission destination of each piece of the data.

At step S223, the telecommunication controlling unit 323 puts together, on the basis of the transmission destinations of the respective pieces of telecommunication data specified at step S222, the data to be transmitted for each of the transmission destinations to generate telecommunication data.

After the process at step S223 ends, the telecommunication controlling process is ended.

<Flow of State Management Process>

Figure 15:
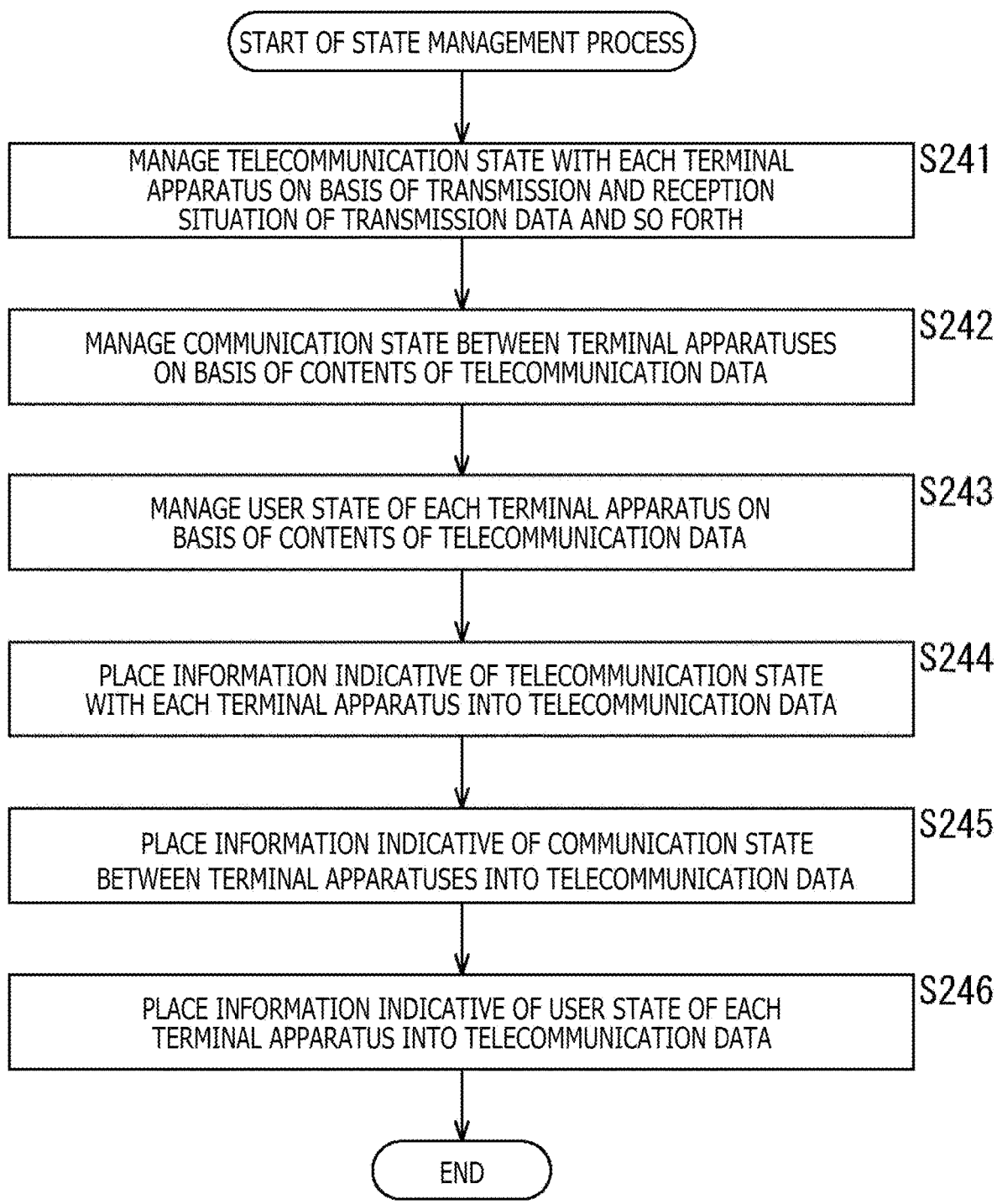
FIG. 15 is a flow chart illustrating an example of a flow of a state management process.

Now, an example of a flow of the state management process (step S143) executed by the server 301 is described with reference to a flow chart of FIG. 15.

After the state management process is started, at step S241, the telecommunication state management unit 331 of the state management unit 324 manages the state of telecommunication with each terminal apparatus on the basis of transmission and reception situations and so forth of telecommunication data and so forth for communication transmitted from the individual terminal apparatuses 100. For example, the telecommunication state management unit 331 specifies (or estimates), on the basis of information regarding telecommunication obtained by transfer of telecommunication data to and from each terminal apparatus 100, values of parameters such as the state of a session, the level of telecommunication stability, the non-telecommunicable state, the telecommunication delay amount, and so forth. Further, the telecommunication state management unit 331 specifies (or estimates) the state of a session among terminal apparatuses 100 on the basis of the states of the sessions managed by the connection management unit 322. It is to be noted that, in order for the telecommunication state management unit 331 to obtain information regarding a state of telecommunication (for example, such parameters as described above), the terminal apparatus 100 or the server 301 may transfer telecommunication other than telecommunication for communication (for example, ping or the like).

At step S242, the communication state management unit 332 manages the state of communication between the terminal apparatuses 100 on the basis of contents of the telecommunication data for communication transmitted from each terminal apparatus 100. For example, the communication state management unit 332 specifies the partner of communication from the orientation or the like of the user on the basis of information indicative of the state of the user included in the telecommunication data.

At step S243, the user state management unit 333 manages the state of the user of each terminal apparatus 100 on the basis of the contents of the telecommunication data for communication transmitted from each terminal apparatus 100. For example, the user state management unit 333 specifies the state of each user on the basis of the information indicative of a state of the user included in the telecommunication data.

At step S244, the telecommunication state management unit 331 places (stores) the information regarding the telecommunication states managed at step S241 into the telecommunication data generated by the telecommunication controlling process (step S142).

At step S245, the communication state management unit 332 places (stores) the information regarding the state of communication between the terminal apparatuses 100 managed at step S242 into the telecommunication data generated by the telecommunication controlling process (step S142).

At step S246, the user state management unit 333 places (stores) the information regarding the state of the user of each terminal apparatus 100 managed at step S243 into the telecommunication data generated by the telecommunication controlling process (step S142).

After the process at step S246 ends, the state management process is ended.

<Flow of Reception Outputting Process>

Figure 16:
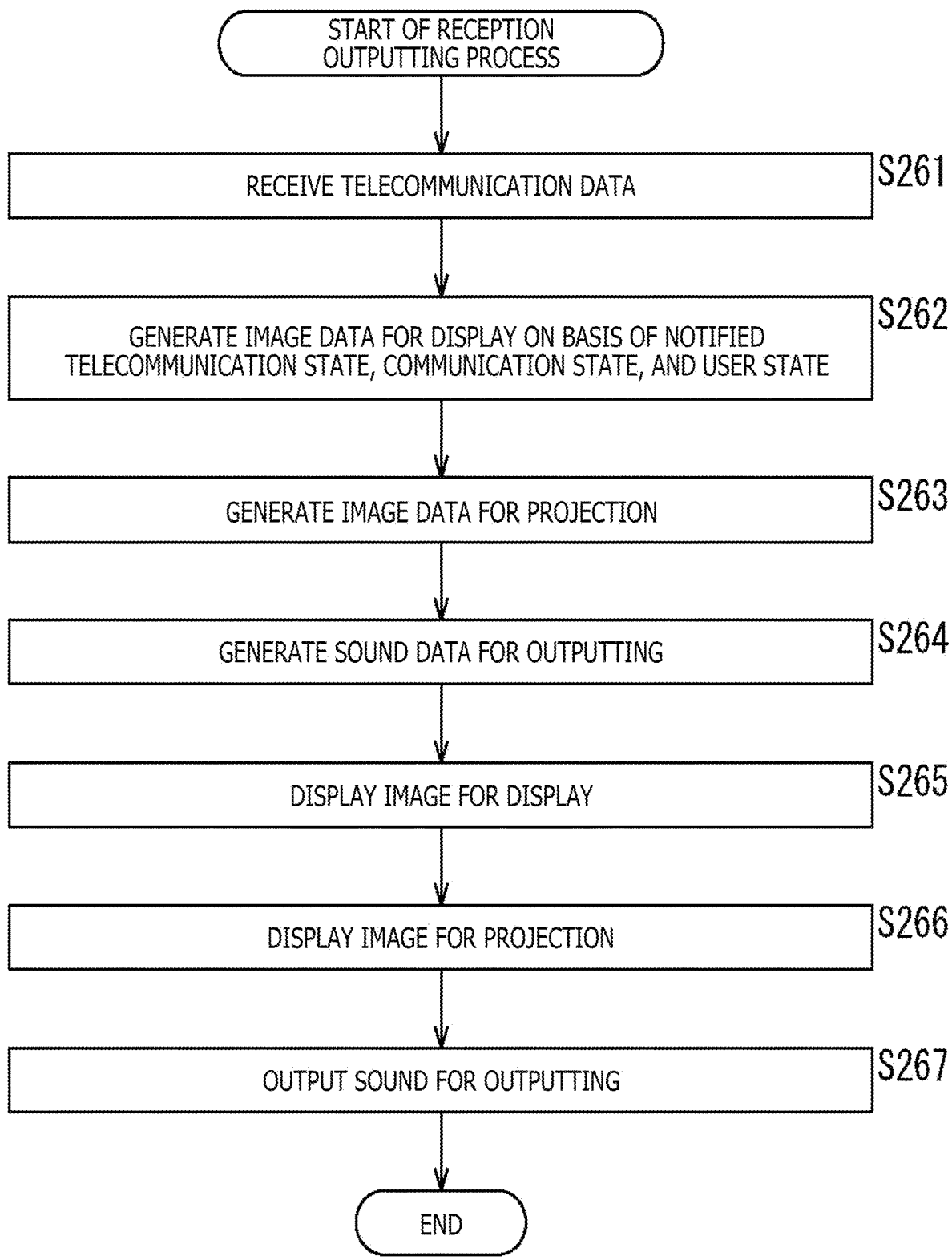
FIG. 16 is a flow chart illustrating an example of a flow of a reception outputting process.

Now, an example of a flow of the reception outputting process (steps S113, S123, and S133) executed by each terminal apparatus 100 is described with reference to a flow chart of FIG. 16.

After the reception outputting process is started, at step S261, the telecommunication controlling unit 361 controls the telecommunication unit 351 to receive telecommunication data transmitted from the server 301.

At step S262, the output information generation unit 363 generates, on the basis of information regarding the state of telecommunication, the state of communication, the states of the users, and so forth included in the telecommunication data received at step S261, an image for display indicative of the state of telecommunication, the state of communication, the states of the users, and so forth, and generates the data (image data for display) as output information.

At step S263, the output information generation unit 363 generates an image for projection, for example, on the basis of the telecommunication data and so forth received at step S261 and generates the data (image data for project on) as output information.

At step S264, the output information generation unit 363 generates sound for outputting, for example, on the basis of the telecommunication data and so forth received at step S261 and generates the data (sound data for outputting) as output information.

At step S265, the display unit 121 displays the image for display generated at step S262.

At step S266, the projection unit 122 projects the image for projection generated at step S263.

At step S267, the speaker 383 outputs the sound for outputting generated at step S264.

After the process at step S267 ends, the reception outputting process is ended.

<Flow of Disclosure Restriction Process>

Figure 17:
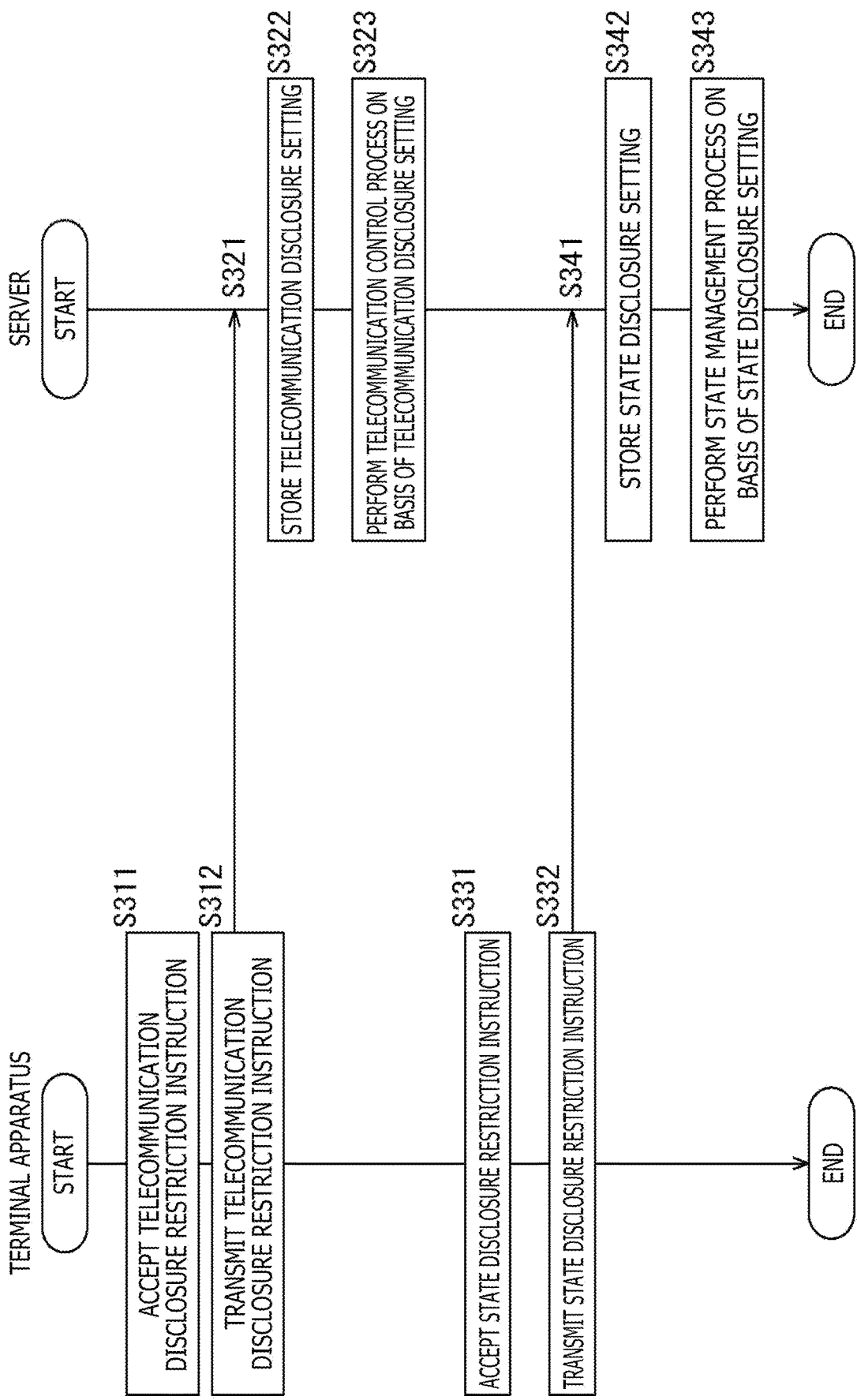
FIG. 17 is a flow chart illustrating an example of a flow of a disclosure restriction process.

Now, an example of a flow of the disclosure restriction process executed by the communication system 300 in the case where control of disclosure/nondisclosure of information regarding telecommunication (the contents of the telecommunication and the state related to the telecommunication) is described with reference to a flow chart of FIG. 17.

After the disclosure restriction process is started, in the case where the disclosure/nondisclosure of contents of the telecommunication is to be controlled, the inputting unit 353 of the terminal apparatus 100 accepts a telecommunication disclosure restriction instruction for designating disclosure/nondisclosure of contents of telecommunication for each terminal apparatus 100 at step S311.

At step S312, the telecommunication data generation unit 362 generates telecommunication data including the telecommunication disclosure restriction instruction. Further, the telecommunication controlling unit 361 transmits the telecommunication data (namely, the telecommunication disclosure restriction instruction) to the server 301.

The telecommunication controlling unit 323 of the server 301 controls the telecommunication unit 321 to receive the telecommunication data (namely, the telecommunication disclosure restriction instruction) at step S321.

At step S322, the telecommunication controlling unit 323 stores the telecommunication disclosure setting (setting regarding whether or not contents of the telecommunication are to be disclosed for each terminal apparatus 100) corresponding to the telecommunication disclosure restriction instruction obtained at step S321. In the case where the telecommunication disclosure setting is stored already, the contents of the telecommunication disclosure setting are updated.

At step S323, the telecommunication controlling unit 323 thereafter performs a telecommunication controlling process on the basis of the stored (or updated) telecommunication disclosure setting.

By executing the processes of the disclosure restriction process in such a manner as described above, the disclosure/nondisclosure of contents of telecommunication is controlled.

Further, in the case where disclosure/nondisclosure of the state of telecommunication is co be controlled, the inputting unit 353 of the terminal apparatus 100 accepts a state disclosure restriction instruction that designates disclosure/nondisclosure of the state of telecommunication for each terminal apparatus 100 at step S331.

At step S332, the telecommunication data generation unit 362 generates telecommunication data including the state disclosure restriction instruction. Further the telecommunication controlling unit 361 transmits the telecommunication data (namely, the state disclosure restriction instruction) to the server 301.

The telecommunication state management unit 331 of the server 301 controls the telecommunication unit 321 to receive the telecommunication data (namely, the state disclosure restriction instruction) at step S341.

At step S342, the telecommunication state management unit 331 stores the state disclosure setting (setting regarding whether or not the state of telecommunication is to be disclosed for each terminal apparatus 100) corresponding to the state disclosure restriction instruction obtained at step S341. In the case where the state disclosure setting is stored already, contents of the state disclosure setting are updated.

At step S343, the telecommunication state management unit 331 thereafter performs a state management process on the basis of the stored (or updated) state disclosure setting.

By executing the processes of the disclosure restriction process in such a manner as described above, the disclosure/nondisclosure of the state of telecommunication is controlled.

By executing the processes in such a manner as described above, the communication system 300, the terminal apparatus 100, and the server 301 can achieve such advantageous effects as described in <1. Presentation of State in Communication System>. Accordingly, it is possible to allow communication between multiple points to be performed more smoothly.

<Other Examples of Configuration of Terminal Apparatus>

Although FIG. 1 depicts an example of an appearance of the terminal apparatus 100, the configuration of the terminal apparatus 100 is desirably set and is not restricted to the example of FIG. 1. For example, (the virtual input interface formed in the region 101B of) the upper face 101A of the housing 101 may be omitted such that inputting of a user instruction is performed by a gesture, sound, or the like of the user 131.

Figure 18:
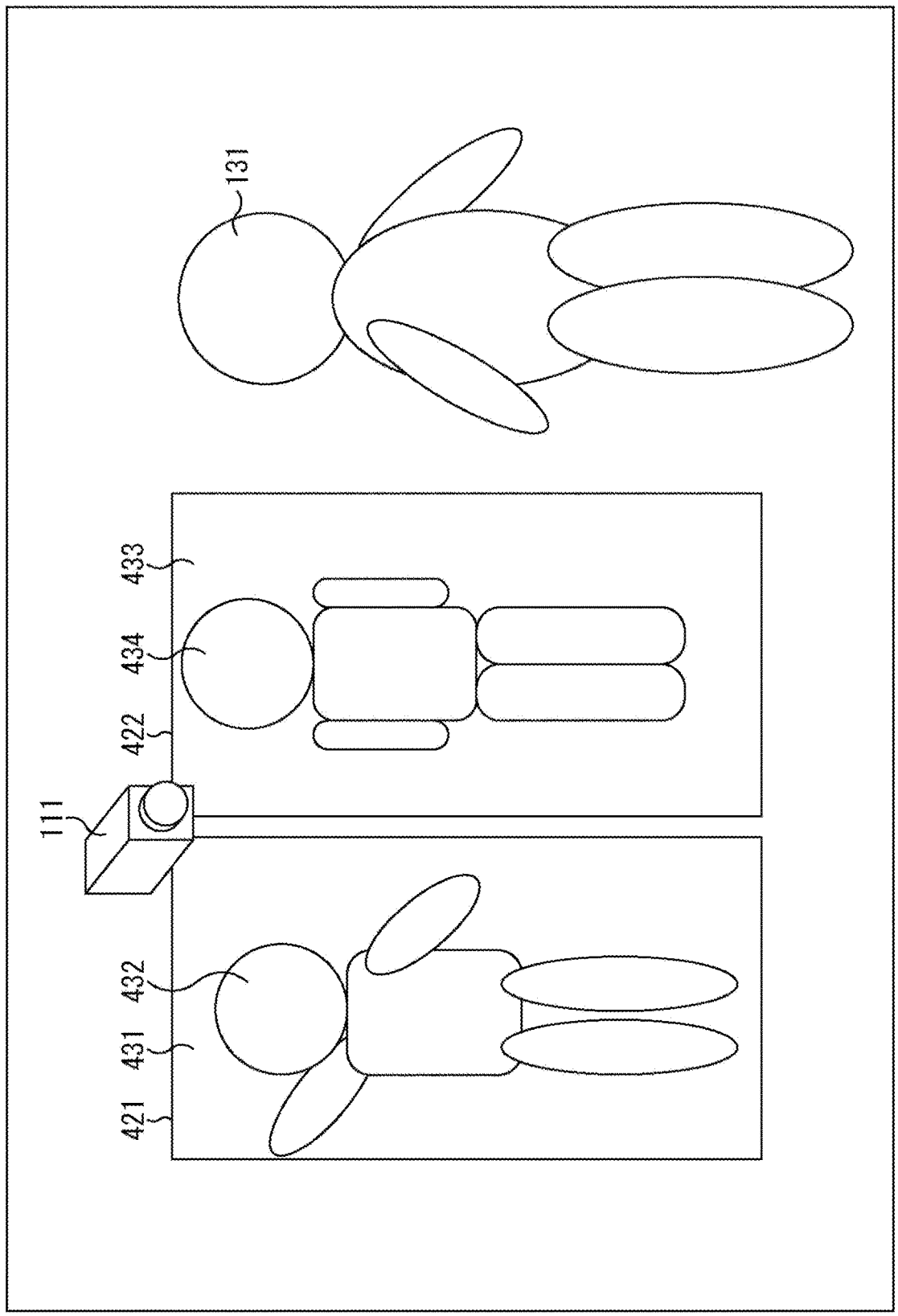
FIG. 18 is a view depicting an example of a main configuration of the terminal apparatus.

For example, the terminal apparatus 100 may include a plurality of display units like a display unit 421 and another display unit 422 as depicted in FIG. 18. In the case or the example of FIG. 18, a telecommunication destination image 431 that is a captured image including another user 432 who is to become a partner of communication is displayed on the display unit 421. The display unit 421 has a display area sufficient to display the whole body of the user 432 in life size. Further, a telecommunication destination image 433 that is a captured image including another user 434 who is to become another partner of communication is displayed on the display unit 422. The display unit 422 has a display area sufficient to display the whole body of the user 434 in life size.

The user 131 is imaged by the imaging unit 111, and the captured image and so forth are transmitted to the terminal apparatuses 100 of the partners of communication (users 432 and 434) through the server 301. Further, in this case, a gesture and so forth of the user 131 are detected from the captured image, and an input such as a user instruction according to the detected gesture and so forth is accepted.

Also, in this case, the terminal apparatus 100 has a configuration basically similar to the configuration depicted in FIG. 11 except that the projection unit 122 and the imaging unit 112 are omitted. Accordingly, also in this case, the communication system 300, the terminal apparatus 100, and the server 301 can achieve such advantageous effects as described in <1. Presentation of State in Communication System>. Accordingly, it is possible for communication between multiple points to be performed more smoothly.

3. Appendix

<Computer>

While the series of processes described above can be executed by hardware, it can otherwise be executed also by software. In the case where the series of processes is executed by software, a program that constructs the software is installed into a computer. The computer here includes a computer that is incorporated in hardware for exclusive use, a personal computer, for example, for universal use that can execute various functions by installing various programs into the personal computer, and so forth.

Figure 19:
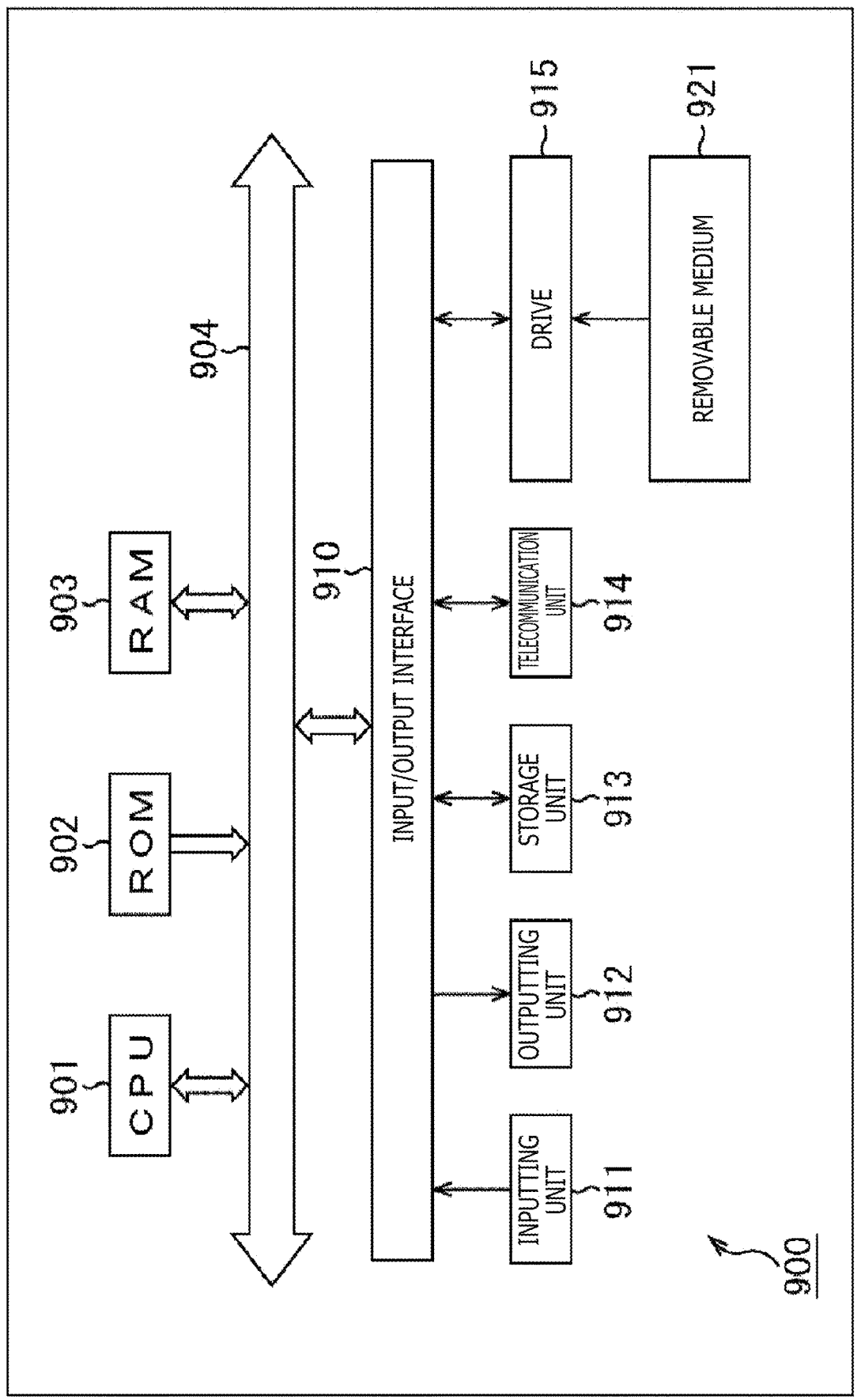
FIG. 19 is a block diagram depicting an example of a main configuration of a computer.

FIG. 19 is a block diagram depicting an example of a hardware configuration of a computer that executes the series of processes described hereinabove according to a program.

In a computer 900 depicted in FIG. 19, a CPU (Central Processing Unit) 901, a ROM (Read Only Memory) 902, and a RAM (Random Access Memory) 903 are connected to one another by a bus 904.

Also, an input/output interface 910 is connected to the bus 904. An inputting unit 911, an outputting unit 912, a storage unit 913, a telecommunication unit 914, and a drive 915 are connected to the input/output interface 910.

The inputting unit 911 includes, for example, a keyboard, a mouse, a microphone, a touch panel, an input terminal, and so forth. The outputting unit 912 includes, for example, a display, a speaker, an output terminal, and so forth. The storage unit 913 includes, for example, a hard disk, a RAM disk, a nonvolatile memory, or the like. The telecommunication unit 914 includes, for example, a network interface. The drive 915 drives a removable medium 921 such as a magnetic disk, an optical disk, a magneto-optical disk, or a semiconductor memory.

In the computer configured in such a manner as described above, the CPU 901 loads a program stored, for example, in the storage unit 913 into the RAM 903 through the input/output interface 910 and the bus 904 and executes the program to perform the series of processes described above. Into the RAM 903, also data and so forth necessary for the CPU 901 to execute various processes are stored suitably.

The program to be executed by the computer (CPU 901) can be recorded on and applied as the removable medium 921 as, for example, a package medium. In this case, by mounting the removable medium 921 on the drive 915, the program can be installed into the storage unit 913 through the input/output interface 910.

Also, it is possible to provide this program through a wired or wireless transmission medium such as a local area network, the Internet, or a digital satellite broadcast. In this case, the program can be received by the telecommunication unit 914 and installed into the storage unit 913.

Alternatively, also it is possible to install the program in the ROM 902 or the storage unit 913 in advance.

<Application Target of Present Technology>

The present technology can be applied not only to a communication system but also to any telecommunication system that connects multiple points. In short, specifications for inputting and outputting of information, telecommunication, and so forth are desirably set unless there is a contradiction to the present technology described above. Further, part of the processes or the specifications described above may be omitted unless there is a contradiction to the present technology.

The present technology can be applied to any configuration. For example, the present technology can be applied to various electronic equipment such as stationary devices (for example, personal computers, routers, and so forth), portable devices (for example, portable telephone sets, notebook type personal computers, smartphones, and so forth), devices for exclusive use, and devices for universal use.

Further, also it is possible to carry out the present technology as a configuration of part of an apparatus, such as a processor (for example, a video processor) as a system LSI (Large Scale Integration) or the like, a module (for example, a video module) that uses a plurality of processors or the like, a unit (for example, a video unit) that uses a plurality of modules or the like, or a set (for example, a video set) formed by adding some other function to a unit.

Further, for example, the present technology can be applied also to a network system including a plurality of apparatuses. For example, the present technology may be carried out as cloud computing in which a plurality of apparatuses shares and cooperates for processing through a network. The present technology may be carried out in a cloud service that provides a service relating to an image (moving image) to any terminal such as, for example, a computer, AV (Audio Visual) equipment, a portable information processing terminal, and an IoT (Internet of Things) device.

It is to be noted that, in the present specification, the term "system" is used to signify an aggregation of a plurality of components (devices, modules (parts), and so forth) and it does not matter whether or not all components are accommodated in the same housing. Accordingly, a plurality of apparatuses accommodated in separate housings and connected to each other through a network is a system, and also one apparatus in which a plurality of modules is accommodated in a single housing is a system.

<Field and Use to Which Present Technology is Applicable>

A system, an apparatus, a processing unit, and so forth to which the present technology is applied can be used in any fields, for example, for traffics, medical care, crime prevention, agriculture, livestock industry, mining, beauty, factories, home appliances, weather, and natural surveillance. Also, they are used for any purposes.

<Others>

The embodiment of the present technology is not limited to the embodiment described hereinabove and allows various alterations without departing from the subject matter of the present technology.

For example, the configuration described as one apparatus (or one processing unit) may be divided so as to configure a plurality of apparatuses (or processing units). Conversely, the configurations described as a plurality of apparatuses (or processing units) in the foregoing description may be put together so as to configure a single apparatus (or processing unit). Further, a configuration not described hereinabove may naturally be added to the configuration of each apparatus (or each processing unit). Furthermore, if a configuration or operation of an entire system is substantially the same, then part of a configuration of a certain apparatus (or processing unit) may be included in a configuration of another apparatus (or another processing unit).

Further, for example, the program described above may be executed by any apparatus. In this case, it is sufficient if the apparatus has necessary functions (functional blocks and so forth) and can obtain necessary information.

Further, for example, each of the steps of one flow chart may be executed by a single apparatus or may be shared and executed by a plurality of apparatuses. Further, in the case where a plurality of processes is included in one step, the plurality of processes may be executed by one apparatus or may be shared and executed by a plurality of apparatuses. In other words, also it is possible to execute a plurality of processes included in one step as a process of a plurality of steps. Conversely, also it is possible to execute a process described as a plurality of steps collectively as one step.

Further, for example, in a program to be executed by a computer, processes of steps that describe the program may be carried out in a time series in the order as described in the present specification or may be executed in parallel or executed individually at necessary timings such as when the process is called. In short, the processes at the steps may be executed in an order different from the order described hereinabove unless they give rise to a contradiction. Further, the processes at the steps that describe this program may be executed in parallel to processes of some other program or may be executed in combination with processes of some other apparatus.

Further, for example, a plurality of technologies related to the present technology can be carried out alone and independently of each other unless they give rise to a contradiction. Naturally, desired ones of present technologies can be carried out together. For example, also it is possible to carry out part or the entirety of the present technology described in connection with any embodiment in combination with part or the entirety of the present technology described in connection with another embodiment. Also, it is possible to carry out any part or the entirety of the present technology described hereinabove together with some other technology that is not described hereinabove.

It is to be noted that the present technology can adopt such a configuration as described below.

(1) An information processing apparatus including:

a reception unit configured to receive information regarding telecommunication performed among telecommunication apparatuses;

a generation unit configured to generate, on the basis of the information received by the reception unit, an image indicative of a state of telecommunication between a first telecommunication apparatus and another telecommunication apparatus and a state of telecommunication between a plurality of other telecommunication apparatuses; and a display unit configured to display the image generated by the generation unit.

(2) The information processing apparatus according to (1), in which the other telecommunication apparatuses include a second telecommunication apparatus and a third telecommunication apparatus.

(3) The information processing apparatus according to (2), in which the image includes a first content that connects a first position indicative of the first telecommunication apparatus and a second position indicative of the second telecommunication apparatus to each other and a second content that connects a third position indicative of the third telecommunication apparatus and the second position to each other.

(4) The information processing apparatus according to (3), in which the first content and the second content each include a road.

(5) The information processing apparatus according to (3) or (4), in which the first position includes a lower end of the image.

(6) The information processing apparatus according to any of (3) to (5), in which the information includes information regarding a stability degree of telecommunication, and the generation unit generates, on the basis of the information regarding the stability degree of telecommunication, the image that indicates the stability degree of each telecommunication as a width of the content.

(7) The information processing apparatus according to any of (3) to (6), in which the information includes information regarding a delay amount of telecommunication, and the generation unit generates, on the basis of the information regarding the delay amount of telecommunication, the image that indicates the delay amount of each telecommunication as a length of the content.

(8) The information processing apparatus according to any of (5) to (7), in which the information includes information regarding a session, and the generation unit generates, on the basis of the information regarding the session, the image that indicates a state in which a session is established between the first telecommunication apparatus and the second telecommunication apparatus as a road that connects the lower end of the image and the second position to each other and indicates another state in which a session is established between the third telecommunication apparatus and the second telecommunication apparatus as a road that connects the third position and the second position to each other.

(9) The information processing apparatus according to (8), in which the information includes information indicative of a non-telecommunicable state, and the generation unit generates, on the basis of the information indicative of the non-telecommunicable state, an image that indicates the non-telecommunicable state of each session as an obstacle provided on the road corresponding to the session.

(10) The information processing apparatus according to any of (2) to (9), in which the information, includes information regarding a session, and the generation unit generates, on the basis of the information regarding the session, the image that indicates a state in which a session is established between the first telecommunication apparatus and the second telecommunication apparatus as a moving body that moves between a first position indicative of the first telecommunication apparatus and a second position indicative of the second telecommunication apparatus and indicates a state in which a session is established between the third telecommunication apparatus and the second telecommunication apparatus as a moving body that moves between a third position indicative of the third telecommunication apparatus and the second position.

(11) The information processing apparatus according to (10), in which the information includes at least one of information regarding a stability degree of telecommunication, information indicative of a non-telecommunicable state, and information regarding a delay amount of telecommunication, and the generation unit generates, on the basis of the information, the image that indicates at least one of the stability degree of each telecommunication, the non-telecommunicable state of each session, and the delay amount of each telecommunication as a manner of movement of the moving body.

(12) The information processing apparatus according to any of (2) to (11), in which the information includes information regarding a session, and the generation unit generates, on the basis of the information regarding the session, the image that indicates a state in which a session is established between the first telecommunication apparatus and the second telecommunication apparatus and a state in which a session is established between the third telecommunication apparatus and the second telecommunication apparatus using a symbol for identifying each of the telecommunication apparatuses.

(13) The information processing apparatus according to (12), in which the information includes at least one of information regarding a stability degree of telecommunication, information indicative of a non-telecommunicable state, and information regarding a delay amount of telecommunication, and the generation unit generates, on the basis of the information, the image that indicates at least one of the stability degree of each telecommunication, the non-telecommunicable state of each session, and the delay amount of each telecommunication as a display state of the symbol.

(14) The information processing apparatus according to any of (1) to (13), in which the reception unit further receives information regarding communication, and the generation unit further generates, on the basis of the information regarding the communication, the image that indicates a state of the communication.

(15) The information processing apparatus according to any of (1) to (14), in which the reception unit further receives information regarding a user of the telecommunication apparatus, and the generation unit further generates, on the basis of the information regarding the user, the image that indicates a state of the user.

(16) The information processing apparatus according to (15), in which the information regarding the user includes information regarding at least one of a sound volume, a level of comprehension of contents of communication, an information sending request, and a session ending request, and the generation unit generates, in regard to each user, the image that indicates at least one of the sound volume, the level of comprehension of contents of the communication, the information sending request, and the session ending request.

(17) The information processing apparatus according to (16), in which the generation unit generates, in regard to each user, the image that includes an avatar indicating at least one of the sound volume, the level of comprehension of contents of the communication, the information sending request, and the session ending request.

(18) The information processing apparatus according to any of (1) to (17), further including:

a detection unit configured to detect a state of a user.

(19) The information processing apparatus according to any of (1) to (18), further including:

a disclosure controlling unit configured to control whether or not information regarding telecommunication with the other telecommunication apparatus is to be disclosed.

(20) An information processing method including:

receiving information regarding telecommunication performed among telecommunication apparatuses;

generating, on the basis of the received information, an image indicative of a state of telecommunication between a first telecommunication apparatus and another telecommunication apparatus and a state of telecommunication between a plurality of other telecommunication apparatuses; and displaying the generated image.

(21) A program for causing a computer to function as:

a reception unit configured to receive information regarding telecommunication performed among telecommunication apparatuses;

a generation unit configured to generate, on the basis of the information received by the reception unit, an image indicative of a state of telecommunication between a first telecommunication apparatus and another telecommunication apparatus and a state of telecommunication between a plurality of other telecommunication apparatuses; and a display unit configured to display the image generated by the generation unit.

(31) An information processing apparatus including:

a reception unit configured to receive information regarding telecommunication performed among information processing apparatuses;

a generation unit configured to generate, on the basis of the information received by the reception unit, an image indicative of a state of telecommunication between this information processing apparatus and another information processing apparatus and a state of telecommunication between a plurality of other information processing apparatuses; and a display unit configured to display the image generated by the generation unit.

(32) The information processing apparatus according to (31), in which the information includes information regarding a session, and the generation unit generates, on the basis of the information regarding the session, the image that indicates a state in which a session is established between this information processing apparatus and the other information processing apparatus as a road that connects a lower end of the image and a picture pattern indicative of the other information processing apparatus to each other and indicates a state in which a session is established between a plurality of the other information processing apparatuses as a road that connects picture patterns indicative of the other information processing apparatuses to each other.

(33) The information processing apparatus according to (32), in which the information includes information regarding a stability degree of telecommunication, and the generation unit generates, on the basis of the information regarding the stability degree of telecommunication, the image that indicates the stability degree of each telecommunication as a width of the road.

(34) The information processing apparatus according to (32) or (33), in which the information includes information indicative of a non-telecommunicable state, and the generation unit generates, on the basis of the information indicative of the non-telecommunicable state, an image that indicates the non-telecommunicable state of each session as an obstacle provided on the road corresponding to the session.

(35) The information processing apparatus according to any of (32) to (34), in which the information includes information regarding a delay amount of telecommunication, and the generation unit generates, on the basis of the information regarding the delay amount of telecommunication, the image that indicates the delay amount of each telecommunication as a length of the road.

(36) The information processing apparatus according to any of (31) to (35), in which the information includes information regarding a session, and the generation unit generates, on the basis of the information regarding the session, the image that indicates a state in which a session is established between this information processing apparatus and the other information processing apparatus as a moving body that moves between a lower end of the image and a picture pattern indicative of the other information processing apparatus and indicates a state in which a session is established between a plurality of the other information processing apparatuses as a moving body that moves between picture patterns indicative of the other information processing apparatuses.

(37) The information processing apparatus according to (36), in which the information includes at least one of information regarding a stability degree of telecommunication, information indicative of a non-telecommunicable state, and information regarding a delay amount of telecommunication, and the generation unit generates, on the basis of the information, the image that indicates at least one of the stability degree of each telecommunication, the non-telecommunicable state of each session, and the delay amount of each telecommunication as a manner of movement of the moving body.

(38) The information processing apparatus according to any of (31) to (37), in which the information includes information regarding a session, and the generation unit generates, on the basis of the information regarding the session, the image that indicates a state in which a session is established between this information processing apparatus and the other information processing apparatus and a state in which a session is established between a plurality of the other information processing apparatuses using a symbol for identifying each of the information processing apparatuses.

(39) The information processing apparatus according to (38), in which the information includes at least one of information regarding a stability degree of telecommunication, information indicative of a non-telecommunicable state, and information regarding a delay amount of telecommunication, and the generation unit generates, on the basis of the information, the image that indicates at least one of the stability degree of each telecommunication the non-telecommunicable state of each session, and the delay amount of each telecommunication as a display state of the symbol.

(40) The information processing apparatus according to any of (31) to (39), in which the reception unit further receives information regarding communication performed utilizing the telecommunication performed among the information processing apparatuses, and the generation unit further generates, on the basis of the information regarding the communication, the image that indicates a state of the communication.

(41) The information processing apparatus according to (40), in which the information regarding the communication includes information indicative of the information processing apparatuses that perform the communication, and the generation unit generates the image indicative of the information processing apparatuses that perform the communication.

(42) The information processing apparatus according to (41), in which the generation unit generates the image that indicates the communication as a moving body and indicates the information processing apparatuses that perform the communication by a movement source and a movement destination of the moving body.

(43) The information processing apparatus according to any of (31) to (42), in which the reception unit further receives information regarding a user of the information processing apparatus, and the generation unit further generates, on the basis of the information regarding the user, the image indicative of a state of the user.

(44) The information processing apparatus according to (43), in which the information regarding the user includes information regarding at least one of a sound volume, a level of comprehension of contents of communication, an information sending request, and a session ending request, and the generation unit generates, in regard to each user, the image that indicates at least one of the sound volume, the level of comprehension of contents of the communication, the information sending request, and the session ending request.

(45) The information processing apparatus according to (44), in which the generation unit generates, in regard to each user, the image that includes an avatar indicating at least one of the sound volume, the level of comprehension of contents of the communication, the information sending request, and the session ending request.

(46) The information processing apparatus according to any of (31) to (45), further including:

a telecommunication unit configured to perform telecommunication for performing communication.

(47) The information processing apparatus according to any of (31) to (46), further including:

a detection unit configured to detect a state of a user; and a transmission unit configured to transmit information regarding the state of the user detected by the detection unit.

(48) The information processing apparatus according to any of (31) to (47), further including:

a disclosure controlling unit configured to control whether or not information regarding telecommunication with the other information processing apparatus is to be disclosed.

(49) An information processing method including:

receiving information regarding telecommunication performed among information processing apparatuses;

generating, on the basis of the received information, an image indicative of a state of telecommunication between this information processing apparatus and another information processing apparatus and a state of telecommunication between a plurality of other information processing apparatuses; and displaying the generated image.

(50) A program for causing a computer to function as:

a reception unit configured to receive information regarding telecommunication performed among information processing apparatuses;

a generation unit configured to generate, on the basis of the information received by the reception unit, an image indicative of a state of telecommunication between this information processing apparatus and another information processing apparatus and a state of telecommunication between a plurality of other information processing apparatuses; and a display unit configured to display the image generated by the generation unit.

(51) An information processing apparatus including:

a reception unit configured to receive telecommunication data transmitted from a plurality of other information processing apparatuses that perform communication with each other;

a generation unit configured to generate, on the basis of the telecommunication data received by the reception unit, information regarding telecommunication between the other information processing apparatuses and place the generated information into the telecommunication data; and a transmission unit configured to transmit the telecommunication data into which the information regarding the telecommunication has been placed by the generation unit to the other information processing apparatuses that are transmission destinations of the telecommunication data.

(52) An information processing method including:

receiving telecommunication data transmitted from a plurality of other information processing apparatuses that perform communication with each other;

generating, on the basis of the received telecommunication data, information regarding telecommunication between the other information processing apparatuses and placing the generated information into the telecommunication data; and transmitting the telecommunication data into which the information regarding the telecommunication has been placed to the other information processing apparatuses that are transmission destinations of the telecommunication data.

(53) A program for causing a computer to function as:

a reception unit configured to receive telecommunication data transmitted from a plurality of other information processing apparatuses that perform communication with each other;

a generation unit configured to generate, on the basis of the telecommunication data received by the reception unit, information regarding telecommunication between the other information processing apparatuses and place the generated information into the telecommunication data; and a transmission unit configured to transmit the telecommunication data into which the information regarding the telecommunication has been placed by the generation unit to the other information processing apparatuses that are transmission destinations of the telecommunication data.

REFERENCE SIGNS LIST

100: Terminal apparatus
101: Housing
102: Arm
111: Imaging unit
112: Imaging unit
121: Display unit
122: Projection unit
131: User
150: Image
151: House
152: Telecommunication destination image
153: User
154: House
155: Telecommunication destination image
156: User
157 to 159: Road
161: Rock
171 to 173: Bird
181 and 182: Symbol
191 to 193: Symbol displaying region
201: Person
211 and 212: Avatar
300: Communication system
301: Server
302: Network
321: Telecommunication unit
322: Connection management unit
322: Telecommunication controlling unit
324: State management unit
331: Telecommunication state management unit
332: Communication state management unit
333: User state management unit
351: Telecommunication unit
352: Control unit
353: Inputting unit
354: Outputting unit
362: Telecommunication data generation unit
363: Output information generation unit
373: Microphone
374: Sensor
375: Information inputting unit
383: Speaker
421 and 422: Display unit
431: Telecommunication destination image
432: User
433: Telecommunication destination image
434: User

The invention claimed is:

1. An information processing apparatus comprising:

a reception unit configured to receive information regarding telecommunication performed among telecommunication apparatuses;

a generation unit configured to generate, on a basis of the information received by the reception unit, an image indicative of a state of telecommunication between a first telecommunication apparatus and another telecommunication apparatus and a state of telecommunication between a plurality of other telecommunication apparatuses; and a display unit configured to display the image generated by the generation unit, wherein the other telecommunication apparatuses include a second telecommunication apparatus and a third telecommunication apparatus, the image includes a first content that connects a first position indicative of the first telecommunication apparatus and a second position indicative of the second telecommunication apparatus to each other, a second content that connects a third position indicative of the third telecommunication apparatus and the second position to each other, and a third content that connects the first position and the third position to each other, the image indicates both the state of telecommunication between the first telecommunication apparatus and the second telecommunication apparatus and the state of telecommunication between the second telecommunication apparatus and the third telecommunication apparatus are disconnected, based on a cause of the disconnected states being the second telecommunication apparatus, and the reception unit, the generation unit, and the display unit are each implemented via at least one processor.

2. The information processing apparatus according to claim 1, wherein the first content and the second content each include a road.

3. The information processing apparatus according to claim 1, wherein the first position includes a lower end of the image.

4. The information processing apparatus according to claim 1, wherein the information includes information regarding a stability degree of telecommunication, and the generation unit is further configured to generate, on a basis of the information regarding the stability degree of telecommunication, the image that indicates the stability degree of each telecommunication as a width of the content.

5. The information processing apparatus according to claim 1, wherein the information includes information regarding a delay amount of telecommunication, and the generation unit is further configured to generate, on a basis of the information regarding the delay amount of telecommunication, the image that indicates the delay amount of each telecommunication as a length of the content.

6. The information processing apparatus according to claim 3, wherein the information includes information regarding a session, and the generation unit is further configured to generate, on a basis of the information regarding the session, the image that indicates a state in which a session is established between the first telecommunication apparatus and the second telecommunication apparatus as a road that connects the lower end of the image and the second position to each other and indicates another state in which a session is established between the third telecommunication apparatus and the second telecommunication apparatus as a road that connects the third position and the second position to each other.

7. The information processing apparatus according to claim 6, wherein the information includes information indicative of a non-telecommunicable state, and the generation unit is further configured to generate, on a basis of the information indicative of the non-telecommunicable state, an image that indicates the non-telecommunicable state of each session as an obstacle provided on the road corresponding to the session.

8. The information processing apparatus according to claim 1, wherein the information includes information regarding a session, and the generation unit is further configured to generate, on a basis of the information regarding the session, the image that indicates a state in which a session is established between the first telecommunication apparatus and the second telecommunication apparatus as a moving body that moves between a first position indicative of the first telecommunication apparatus and a second position indicative of the second telecommunication apparatus and indicates a state in which a session is established between the third telecommunication apparatus and the second telecommunication apparatus as a moving body that moves between a third position indicative of the third telecommunication apparatus and the second position.

9. The information processing apparatus according to claim 8, wherein the information includes at least one of information regarding a stability degree of telecommunication, information indicative of a non-telecommunicable state, and information regarding a delay amount of telecommunication, and the generation unit is further configured to generate, on a basis of the information, the image that indicates at least one of the stability degree of each telecommunication, the non-telecommunicable state of each session, and the delay amount of each telecommunication as a manner of movement of the moving body.

10. The information processing apparatus according to claim 1, wherein the information includes information regarding a session, and the generation unit is further configured to generate, on a basis of the information regarding the session, the image that indicates a state in which a session is established between the first telecommunication apparatus and the second telecommunication apparatus and a state in which a session is established between the third telecommunication apparatus and the second telecommunication apparatus using a symbol for identifying each of the telecommunication apparatuses.

11. The information processing apparatus according to claim 10, wherein the information includes at least one of information regarding a stability degree of telecommunication, information indicative of a non-telecommunicable state, and information regarding a delay amount of telecommunication, and the generation unit is further configured to generate, on a basis of the information, the image that indicates at least one of the stability degree of each telecommunication, the non-telecommunicable state of each session, and the delay amount of each telecommunication as a display state of the symbol.

12. The information processing apparatus according to claim 1, wherein the reception unit is further configured to receive information regarding communication, and the generation unit is further configured to generate, on a basis of the information regarding the communication, the image that indicates a state of the communication.

13. The information processing apparatus according to claim 1, wherein the reception unit is further configured to receive information regarding a user of the telecommunication apparatus, and the generation unit is further configured to generate, on a basis of the information regarding the user, the image that indicates a state of the user.

14. The information processing apparatus according to claim 13, wherein the information regarding the user includes information regarding at least one of a sound volume, a level of comprehension of contents of communication, an information sending request, and a session ending request, and the generation unit is further configured to generate, in regard to each user, the image that indicates at least one of the sound volume, the level of comprehension of contents of the communication, the information sending request, and the session ending request.

15. The information processing apparatus according to claim 14, wherein the generation unit is further configured to generate, in regard to each user, the image that includes an avatar indicating at least one of the sound volume, the level of comprehension of contents of the communication, the information sending request, and the session ending request.

16. The information processing apparatus according to claim 1, further comprising:

a detection unit configured to detect a state of a user, wherein the detection unit is implemented via at least one processor.

17. The information processing apparatus according to claim 1, further comprising:

a disclosure controlling unit configured to control whether or not information regarding telecommunication with the other telecommunication apparatus is to be disclosed, wherein the disclosure controlling unit is implemented via at least one processor.

18. An information processing method comprising:

receiving information regarding telecommunication performed among telecommunication apparatuses;

generating, on a basis of the received information, an image indicative of a state of telecommunication between a first telecommunication apparatus and another telecommunication apparatus and a state of telecommunication between a plurality of other telecommunication apparatuses; and displaying the generated image, wherein the other telecommunication apparatuses include a second telecommunication apparatus and a third telecommunication apparatus, the image includes a first content that connects a first position indicative of the first telecommunication apparatus and a second position indicative of the second telecommunication apparatus to each other, a second content that connects a third position indicative of the third telecommunication apparatus and the second position to each other, and a third content that connects the first position and the third position to each other, and the image indicates both the state of telecommunication between the first telecommunication apparatus and the second telecommunication apparatus and the state of telecommunication between the second telecommunication apparatus and the third telecommunication apparatus are disconnected, based on a cause of the disconnected states being the second telecommunication apparatus.

19. A non-transitory computer-readable medium having embodied thereon a program, which when executed by a computer causes the computer to execute an information processing method, the method comprising:

receiving information regarding telecommunication performed among telecommunication apparatuses;

generating, on a basis of the information received by the reception unit, an image indicative of a state of telecommunication between a first telecommunication apparatus and another telecommunication apparatus and a state of telecommunication between a plurality of other telecommunication apparatuses; and displaying the image generated by the generation unit, wherein the other telecommunication apparatuses include a second telecommunication apparatus and a third telecommunication apparatus, the image includes a first content that connects a first position indicative of the first telecommunication apparatus and a second position indicative of the second telecommunication apparatus to each other, a second content that connects a third position indicative of the third telecommunication apparatus and the second position to each other, and a third content that connects the first position and the third position to each other, and the image indicates both the state of telecommunication between the first telecommunication apparatus and the second telecommunication apparatus and the state of telecommunication between the second telecommunication apparatus and the third telecommunication apparatus are disconnected, based on a cause of the disconnected states being the second telecommunication apparatus.

* * * * *